United States Patent [19]
Matsumoto

[11] Patent Number: 5,838,747
[45] Date of Patent: Nov. 17, 1998

[54] ASYNCHRONOUS SERIAL DATA TRANSMISSION APPARATUS WITH EDGE INTERRUPT OPERATION AND TIMER INTERRUPT OPERATION

[75] Inventor: Hisaji Matsumoto, Kanagawa, Japan

[73] Assignee: NEC Corporation, Tokyo, Japan

[21] Appl. No.: 688,644

[22] Filed: Jul. 29, 1996

[30] Foreign Application Priority Data

Jul. 28, 1995 [JP] Japan .................................. 7-193688

[51] Int. Cl.[6] .................................................. H04L 25/38
[52] U.S. Cl. .......................... 375/370; 375/295; 375/377; 375/219
[58] Field of Search .................................... 375/370, 369, 375/219, 220, 377, 295; 395/800.38, 733; 340/825.2, 825.06

[56] References Cited

U.S. PATENT DOCUMENTS

| | | | |
|---|---|---|---|
| 5,450,450 | 9/1995 | Lee | 375/254 |
| 5,581,556 | 12/1996 | Ohie | 375/220 |
| 5,631,925 | 5/1997 | Koenzen | 375/225 |

FOREIGN PATENT DOCUMENTS 43 08 418   7/1994   Germany .

OTHER PUBLICATIONS

Ronald L. Mitchel "A Small Area Network for Cars" *SAE Technical Papers*, No. 840317, Feb. 1994, pp. 177–184.

*Primary Examiner*—Stephen Chin
*Assistant Examiner*—Betsy Lee Deppe
*Attorney, Agent, or Firm*—Foley & Lardner

[57] ABSTRACT

In a serial data transmission apparatus connected to a data transmission bus, an edge detector detects an edge in a signal at the data transmission bus. An edge interrupt operation is carried out to operate a timer in response to the edge. The edge interrupt operation is stopped when the timer is being operated. A timer interrupt operation carries out a fetching operation of a bit data on the data transmission bus in a receiving mode or a transmitting operation of a bit data to the data transmission bus in a transmitting mode, in response to the timer means whose content reaches a predetermined value.

9 Claims, 24 Drawing Sheets

Fig. 12   STEP 809

STEP 813

STEP 808

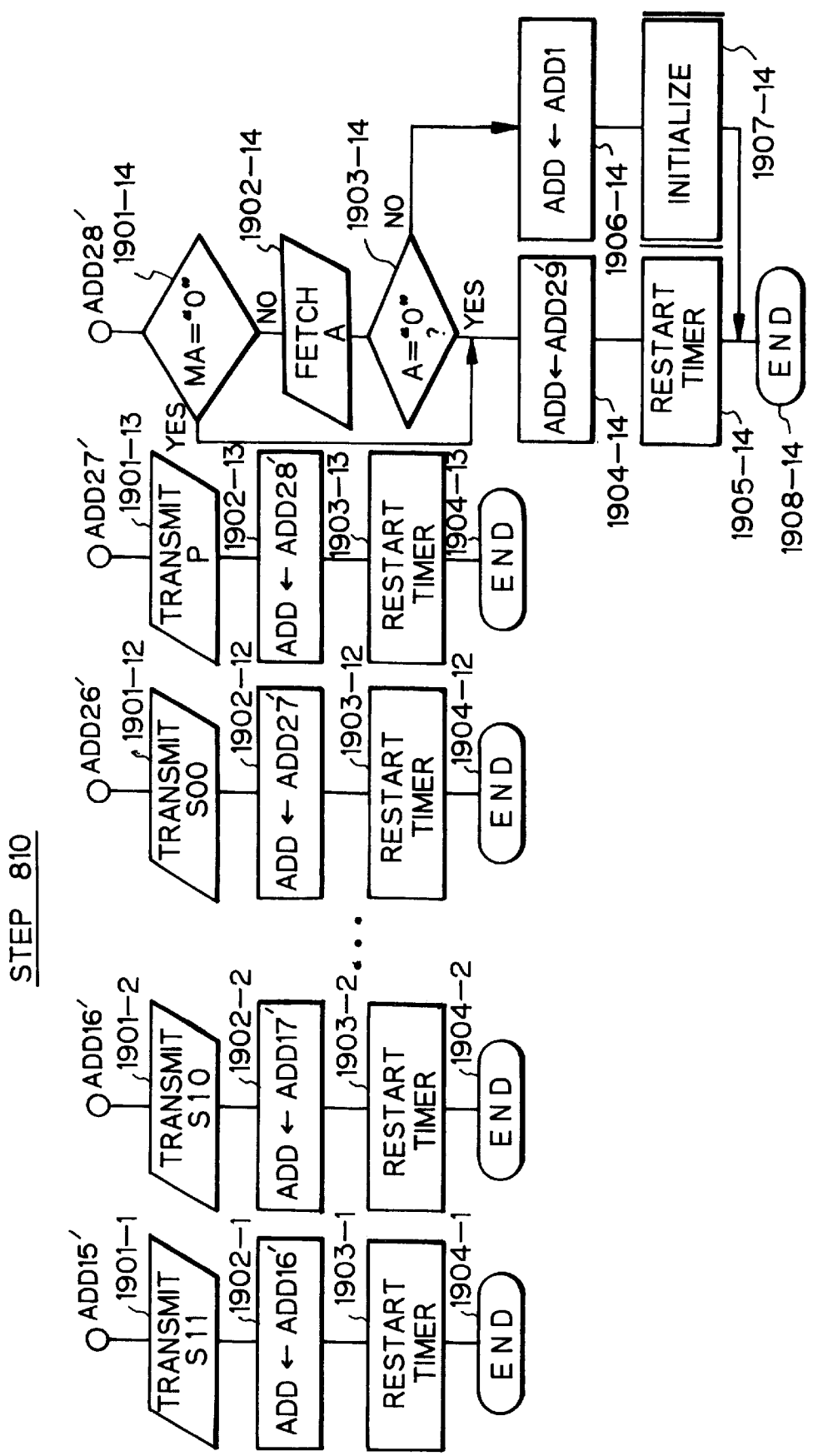

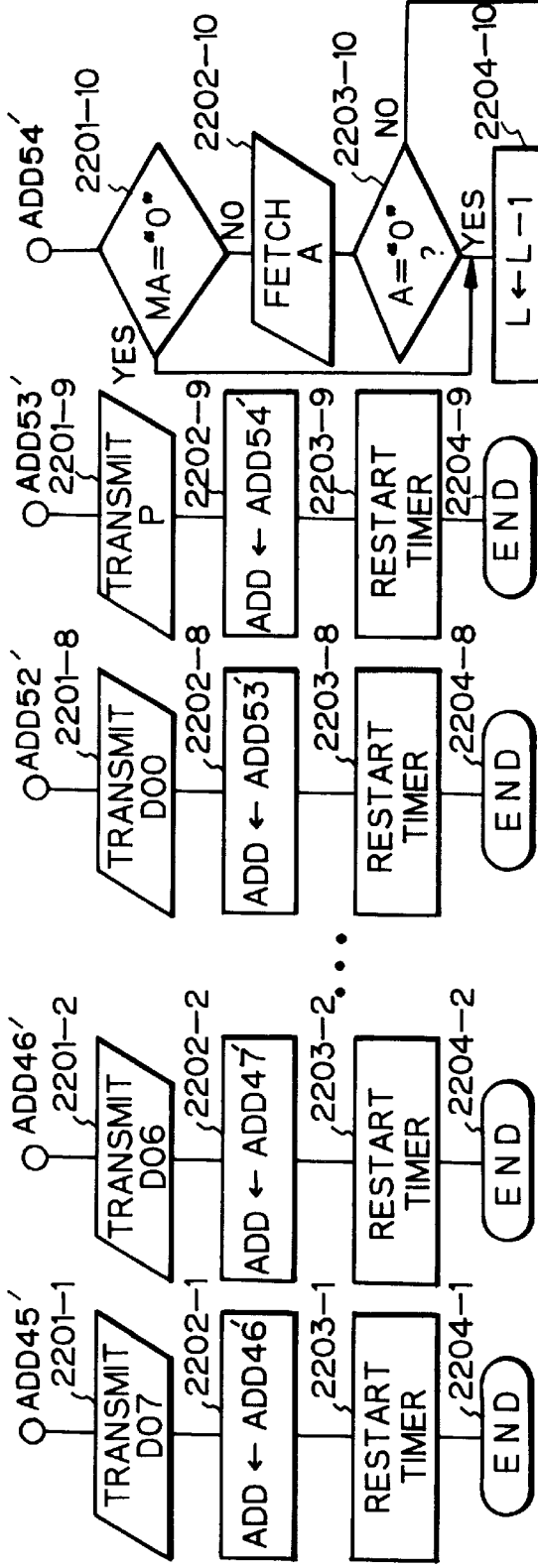

ASYNCHRONOUS SERIAL DATA TRANSMISSION APPARATUS WITH EDGE INTERRUPT OPERATION AND TIMER INTERRUPT OPERATION

BACKGROUND OF THE INVENTION

1. Field of the Invention

The present invention relates to an asynchronous serial data transmission apparatus.

2. Description of the Related Art

In an asynchronous transmission system, at a start of transmission, transmission parameters such as a transmission baud rate, a length of data bits, a form of parity, and a length of stop bits of a master unit, i.e., a transmitting side must be completely consistent with those of a slave unit, i.e., a receiving side. In this case, if there is only one master unit and only one slave unit, the date formats are relatively simple, and therefore, it is easy to make the data format of one conform to the other.

On the other hand, in an asynchronous transmission system for audio-visual apparatus such as television sets and video tape recorders, a digital bus (D2B) protocol standardized by the International Electrotechnical Committee (IEC), is relatively complex. Since a serial data transmission apparatus therefor is required to respond to an accurate synchronization operation, a bus occupying operation in a transmitting operation and a high speed operation, the serial data transmission apparatus has become more complex and more expensive.

SUMMARY OF THE INVENTION

It is an object of the present invention to provide a simple asynchronous serial data transmission apparatus.

According to the present invention, in a serial data transmission apparatus connected to a data transmission bus, an edge detector detects an edge in a signal at the data transmission bus. An edge interrupt operation is carried out to operate a timer in response to the edge. The edge interrupt operation is stopped when the timer is being operated. A timer interrupt operation carries out a fetching operation of a bit data on the data transmission bus in a receiving mode or a transmitting operation of a bit data to the data transmission bus in a transmitting mode, in response to the timer means whose content reaches a predetermined value.

BRIEF DESCRIPTION OF THE DRAWINGS

The present invention will be more clearly understood from the description as set forth below, as compared with the prior art, with reference to the accompanying drawings, wherein:

FIGS. 7, 8, 9, 10, 11, 12, 13, 14, 15, 16, 17, 18A, 18B, 18C, 18D, 19, 20, 21 and 22 are flowcharts showing the operation of the CPU of FIG. 4.

DESCRIPTION OF THE PREFERRED EMBODIMENT

Before the description of the preferred embodiment, a prior art serial data transmission system will be explained with reference to FIGS. 1, 2 and 3.

Figure 1:
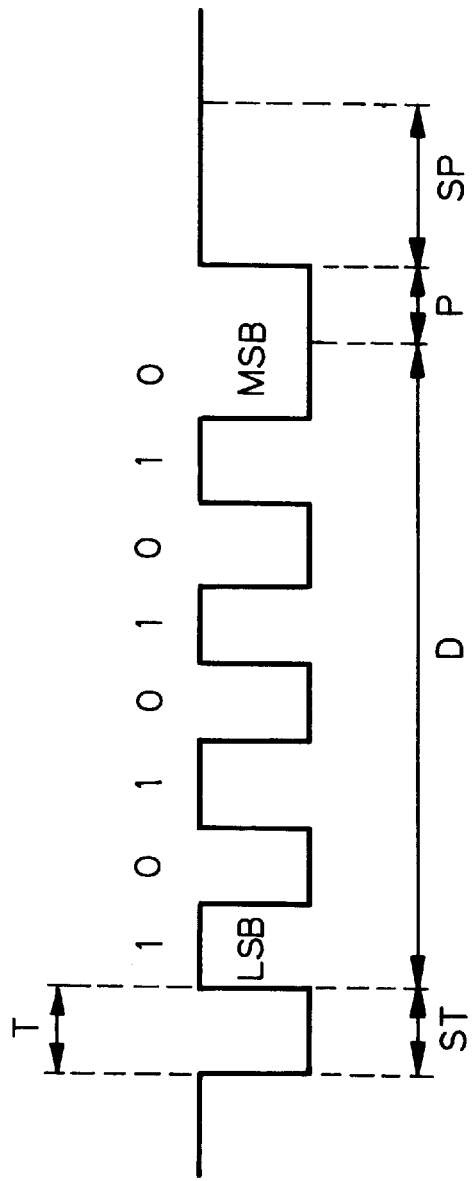
FIG. 1 is a timing diagram showing a signal format of a prior art start-stop transmisson system.

In FIG. 1, which shows a signal format of a prior art start-stop transmission system which is a typical asynchronous transmission system, one frame is comprised of a start bit ST, 5 to 8 data bits D, a parity bit P, and one or two stop bits SP. The start bit ST shows a start of transmission, and has a pulse of "0" having a length of one bit. Note that a level immediately before the start pulse ST is "1." The data bits D show the content of transmitted data. The parity bit P is a checking bit for the data bits D. That is, the parity bit P shows an addition result of the data bits D (mod 2). The stop bits SP show an end of transmission as well as an advance notice of the next start of transmission, and have a pulse of "1." In FIG. 1, a time period T for one bit is constant.

In the asynchronous transmission system, at a start of transmission, transmission parameters such as a transmission baud rate, a length of data bits, a form of the parity, a length of stop bits of a master unit, i.e., a transmitting side, must be completely consistent with those of a slave unit, i.e., a receiving side. In this case, if there is only one master unit and only one slave unit, the data formats are relatively simple, and therefore, it is easy to make the data format of one conform to the other.

Figure 2:
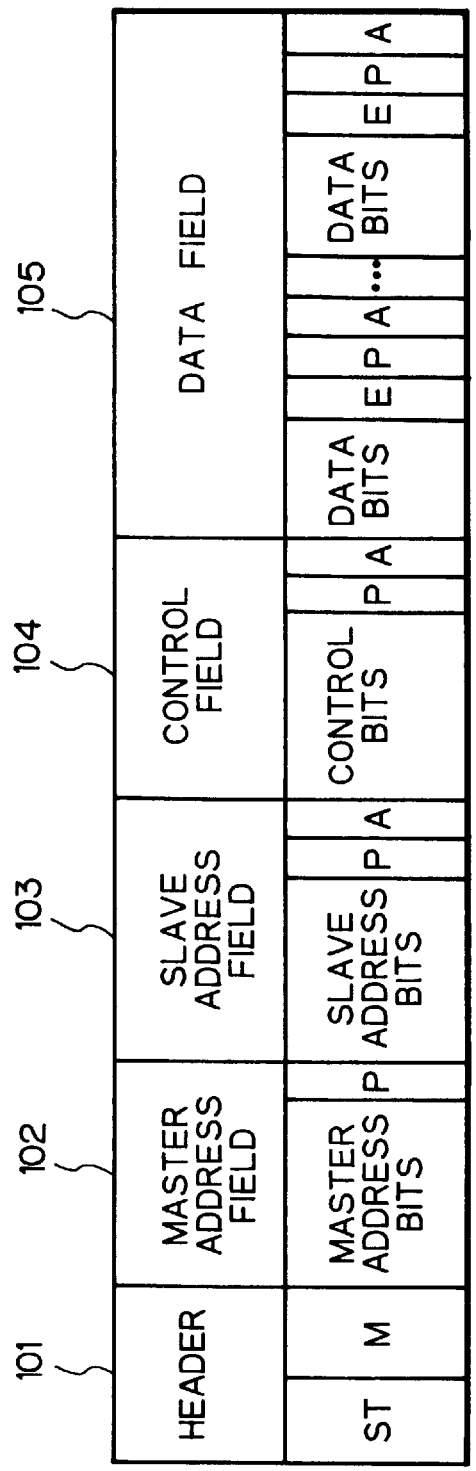
FIG. 2 is a signal format of a prior art D2B protocol.

On the other hand, in an asynchronous transmission system for audio-visual apparatus such as television sets and video tape recorders, a digital bus (D2B) protocol standardized by the International Electrotechnical Committee (IEC), which is shown in FIG. 2, is relatively complex.

Referring to FIG. 2, one frame of D2B protocol data is comprised of a header 101, a master address field 102, a slave address field 103, a control field 104 and a data field 105. The header 101 includes a start bit ST showing a start of transmission and a mode bit M showing a transmission baud rate. The master address field 102 includes master address bits showing an address of a master unit and a parity bit P. The slave address field 103 includes slave address bits showing an address of a slave unit, a parity bit P, and an acknowledgement bit A. The control field 104 includes control bits showing a content of transmission from the master unit to the slave unit and vice versa and transmission of a command from the master unit to the slave unit, a parity bit P and an acknowledgement bit A. The data field 105 includes a series of 8-bit data (or commands), each of which is followed by an end-of-data E, a parity bit P and an acknowledgement bit A. Note that, if the end-of-data E is "0", the data is ended, while if the end-of-data E is "1", the data is continued.

Figure 3:
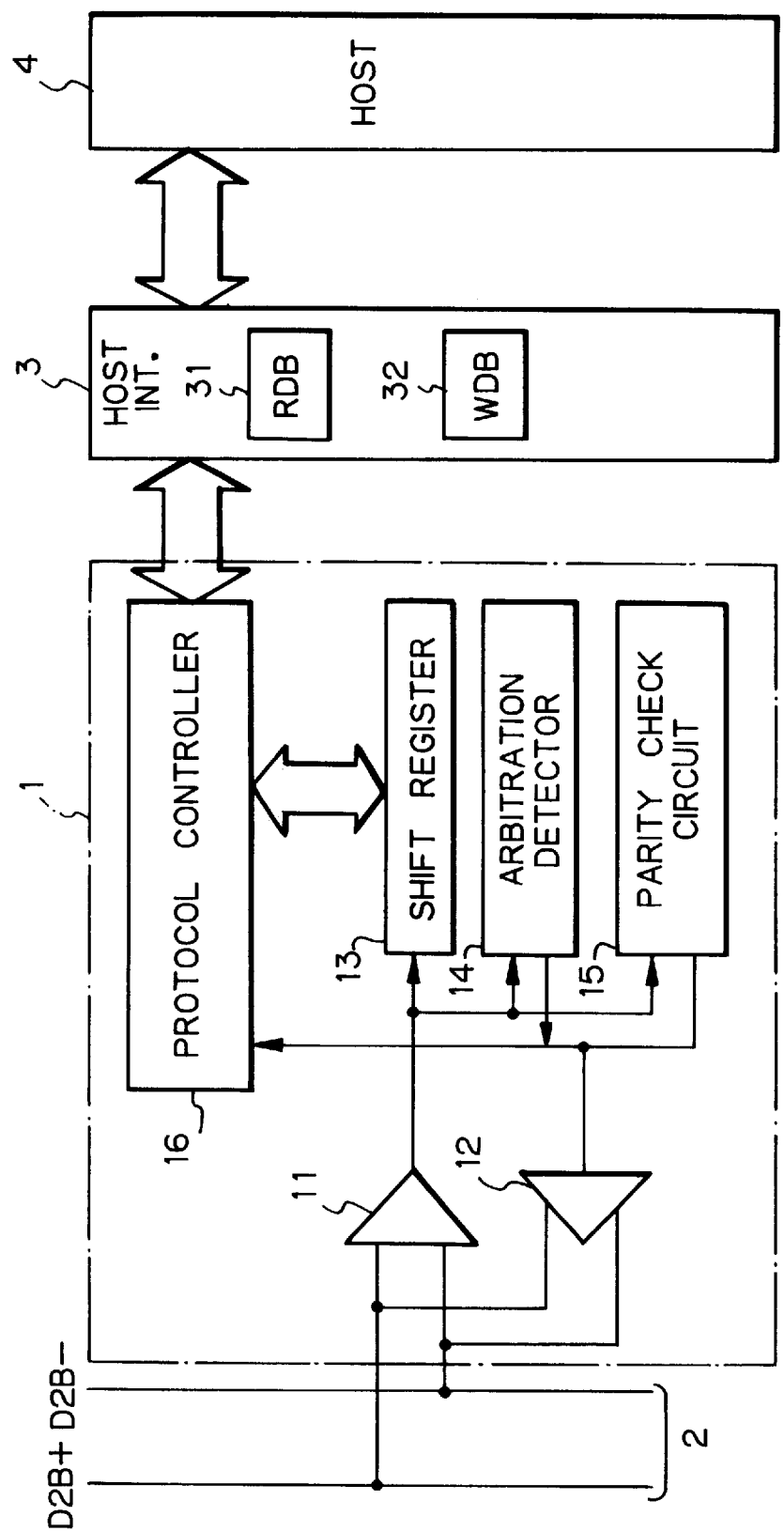
FIG. 3 is a block diagram illustrating a prior art serial data transmission apparatus.

In FIG. 3, which illustrates a prior art serial data transmission apparatus for the D2B protocol of FIG. 2, a serial data transmission apparatus 1 is connected between a D2B bus 2 formed by lines D2B+ and D2B− and a host interface 3. The host interface 3 is connected to a host controller 4. The serial data transmission apparatus 1 includes a D2B receiver 11 for receiving data from the D2B bus 2 and a D2B transmitter 12 for transmitting data to the D2B bus 2. A shift register 13 stores data from the D2B receiver 11. An arbitration detector 14 performs an occupying operation upon the D2B bus 2. A parity checking circuit 15 performs a parity checking operation upon each field. The shift register 13, the arbitration detector 14 and the parity checking circuit 15 are connected to a protocol controller 16 which controls serial data transmission.

The host interface 3 includes a read data buffer 31 for storing data from the serial data transmission apparatus 1 in a receiving mode. Also, the host interface 3 includes a write data buffer 32 for storing data to be transmitted to the serial data transmission apparatus 1 in a transmitting mode.

A receiving operation of the serial data transmission apparatus 1 of FIG. 3 is carried out as follows. That is, data from the D2B receiver 11 is written into the shift register 13. When an amount of data written into the shift register 13 reaches a predetermined amount, the data of the shift register 13 are transferred in parallel to the protocol controller 16. Simultaneously, a parity checking operation is performed by the parity checking circuit 15 upon the data from the D2B receiver 11, and the result of parity checking is transferred to the protocol controller 16. Then, if the parity checking result is successful, the protocol controller 16 transmits received data to the read data buffer 31 of the host interface 3.

A transmitting operation of the serial data transmission apparatus 1 of FIG. 3 is carried out as follows. That is, when the protocol controller 16 receives data to be transmitted from the write data buffer 32 of the host interface 3, the arbitration detector 14 performs an occupying operation upon the D2B bus 2, and after the D2B bus 2 is occupied by the serial data transmission apparatus 1, the protocol controller 16 transmits the data via the D2B transmitter 12 to the D2B bus 2.

Since the serial data transmission apparatus 1 of FIG. 3 is required to respond to an accurate synchronization, a bus occupying operation in a transmitting operation and a high speed operation, the serial data transmission apparatus 1 has become more complex and more expensive.

Figure 4:
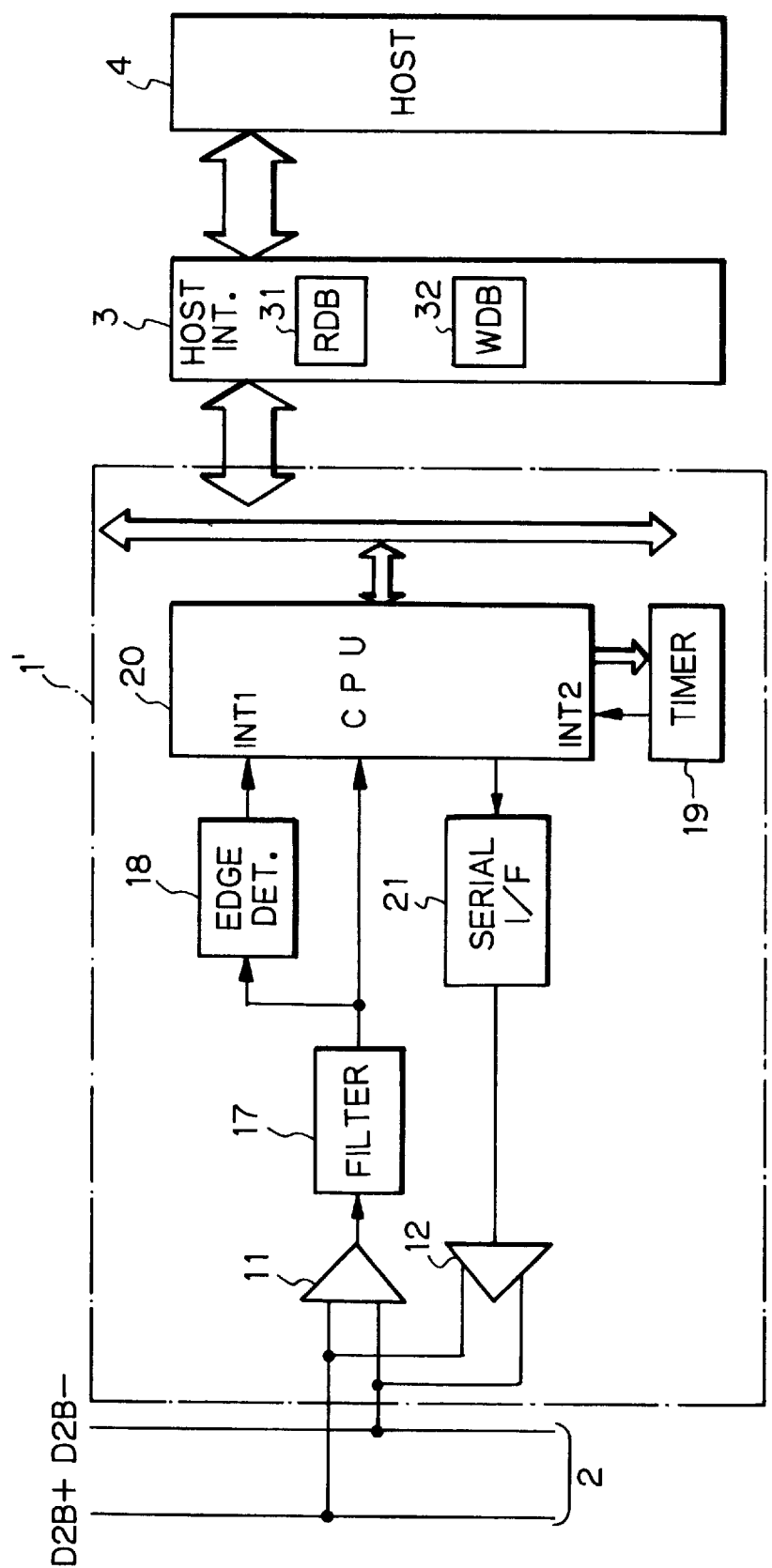
FIG. 4 is a block diagram illustrating an embodiment of the serial data transmission apparatus according to the present invention.

In FIG. 4, which illustrates an embodiment of the present invention, a serial data transmission apparatus 1' includes a filter 17, an edge detector 18, a timer 19, a central processing unit (CPU) 20 and a serial interface 21 instead of the shift register 13, the arbitration detector 14, the parity check circuit 15 and the protocol controller 16 of FIG. 3. That is, when an output signal of the edge detector 18 is input to an interrupt terminal INT1 of the CPU 20, an edge detection interrupt routine, which will be explained later, is carried out. Also, when an output signal of the timer 19 is input to an interrupt terminal INT2 of the CPU 20, a timer interrupt routine, which will be explained later, is carried out.

Figure 5:
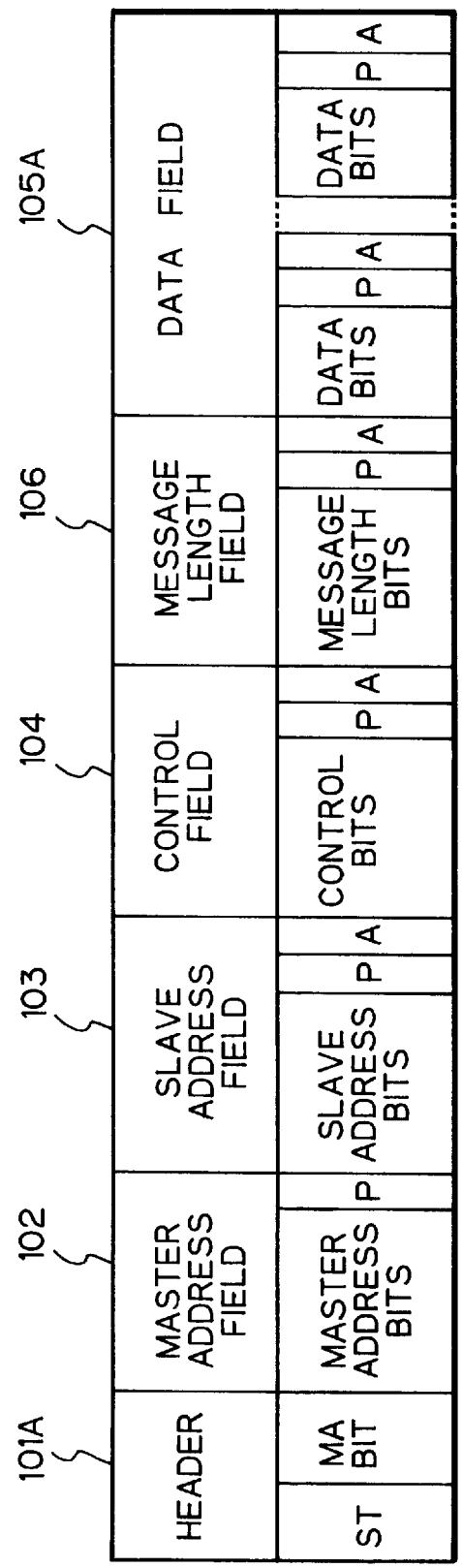
FIG. 5 is a signal format of a protocol used in the apparatus of FIG. 4.

In FIG. 5, which shows a signal format used in the serial data transmission apparatus of FIG. 4, a header 101A includes a multiaddress bit instead of the mode bit M of the header 101 of FIG. 2, and a data field 105A does not include the end-of-data E of the data field 105 of FIG. 2. Also, a message length field 106 is added to define the number of bytes of the data field 105A. The message length field 106 includes message length bits followed by a parity bit P and an acknowledgement bit A.

Figure 6:
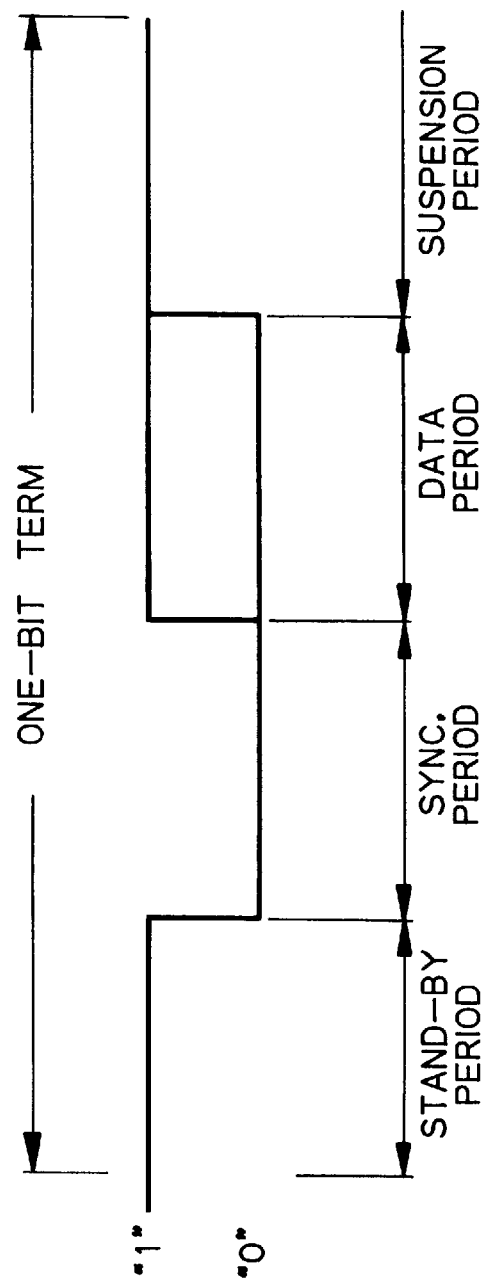
FIG. 6 is a timing diagram showing one bit of the signal format of FIG. 5.

In FIG. 6, which is a timing diagram showing one bit of the signal format of FIG. 5, a term of each bit is comprised of a stand-by time period having a value "1", a synchronization time period having a value "0", a data time period having a value depending upon the value of the bit, and a suspension time period having a value "1". In this case, a length of the synchronization time period is approximately the same as a length of the data time period.

Figure 7:
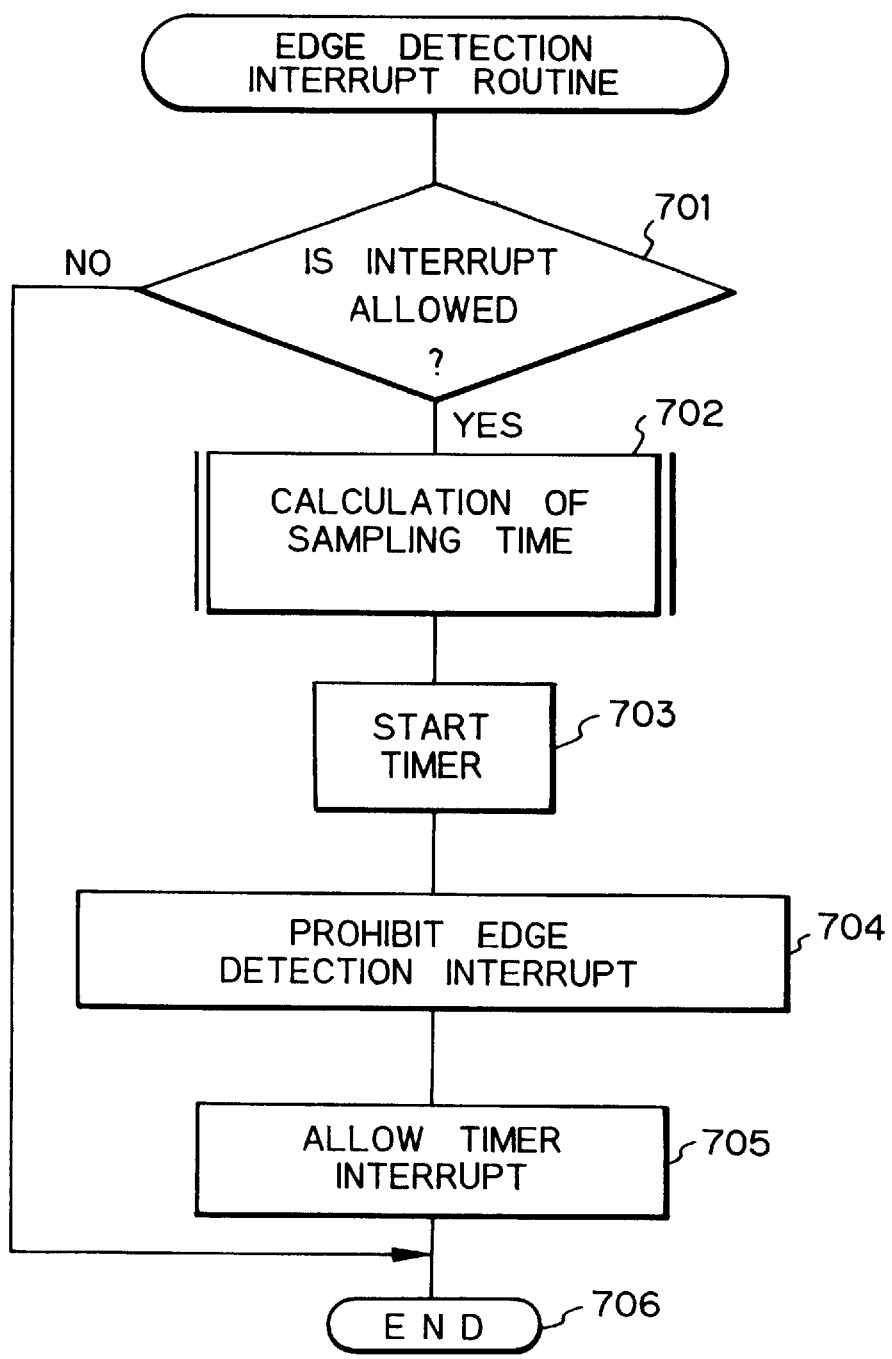

The edge detection interrupt routine is shown in FIG. 7.

First, at step 701, it is determined whether or not an edge detection interrupt operation is allowed. Note that, when a timer interrupt operation is being carried out, the edge detection interrupt operation is prohibited. Only if the edge detection interrupt operation is allowed, does the control proceed to step 702. Otherwise, the control proceeds directly to step 706.

Next, at step 702, a sampling time to be set in the timer 19 is calculated.

Next, at step 703, the sampling time is set in the timer 19, and the timer 19 is started.

Next, at step 704, the edge detection interrupt operation is prohibited, while, at step 705, the timer interrupt operation is allowed.

The edge detection interrupt routine of FIG. 7 is completed by step 706.

Figure 8:
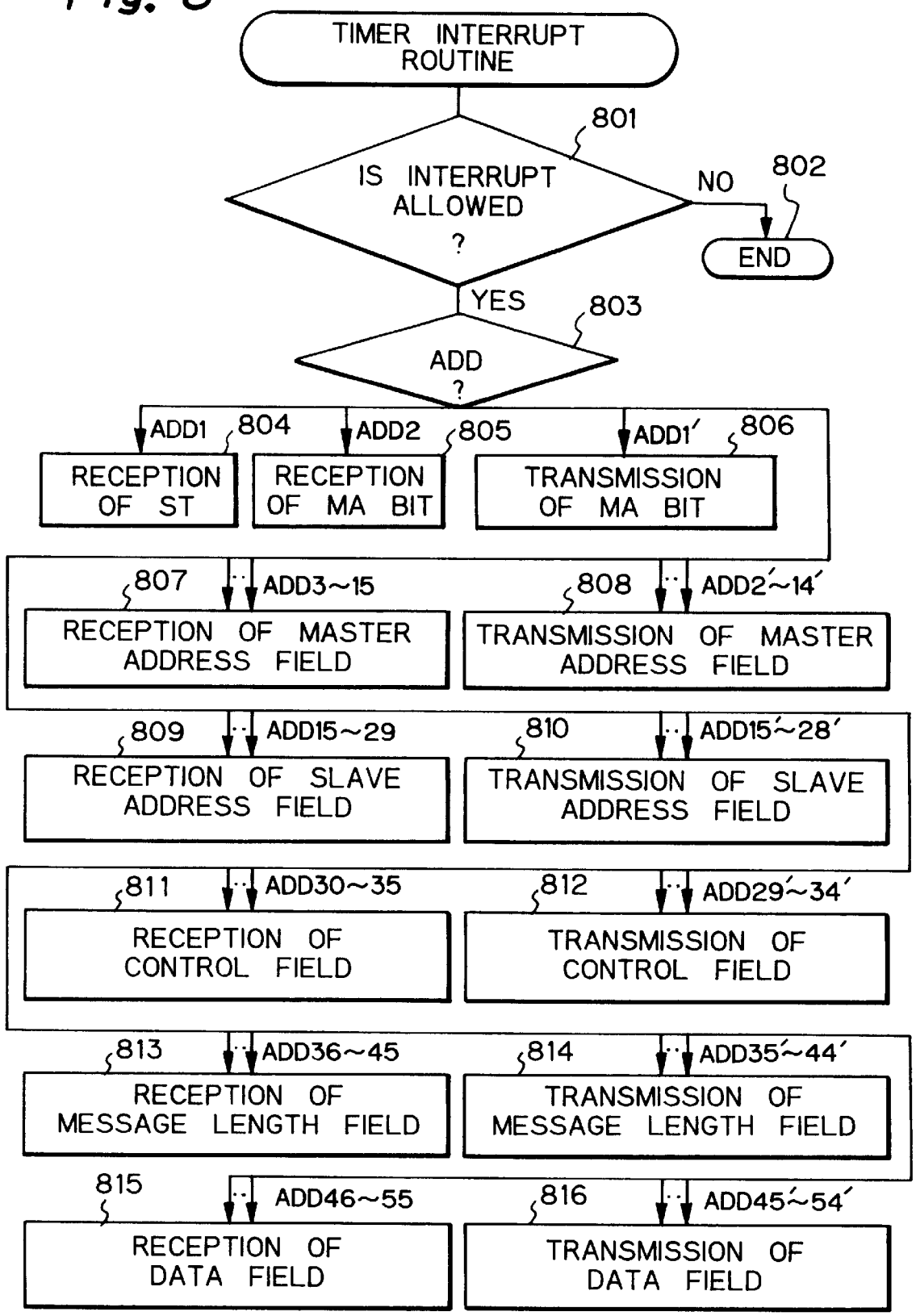

The timer interrupt routine is shown in FIG. 8.

First, at step 801, it is determined whether or not a timer interrupt operation is allowed. Note that the timer interrupt operation is allowed by step 705 of FIG. 7. If the timer interrupt operation is prohibited, the control proceeds to step 802, If the timer interrupt operation is allowed, the control proceeds to step 803.

At step 803, an address ADD is determined. Note that the address ADD is initialized at ADD1 for a receiving mode, and the address ADD is initialized at ADD1' for a transmitting mode.

When ADD is equal to ADD1, a receiving process of a start bit ST is carried out at step 804.

When ADD is equal to ADD2, a receiving process of a multiaddress bit is carried out at step 805.

When ADD is equal to ADD3, ADD4, . . . , or ADD15, a receiving process of a master address field is carried out at step 807.

When ADD is equal to ADD16, ADD17, . . . , or ADD29, a receiving process of a slave address field is carried out at step 809.

When ADD is equal to ADD30, ADD31, . . . , or ADD35, a receiving process of a control field is carried out at step 811.

When ADD is equal to ADD36, ADD37, . . . , or ADD45, a receiving process of a message length field is carried out at step 813.

When ADD is equal to ADD46, ADD47, . . . , or ADD55, a receiving process of a data field is carried out at step 815.

When ADD is equal to ADD1', a transmitting process of a multiaddress bit is carried out at step 806.

When ADD is equal to ADD2', ADD3', . . . , or ADD14', a transmitting process of a master address field is carried out at step 808.

When ADD is equal to ADD15', ADD16', . . . , or ADD28', a transmitting process of a slave address field is carried out at step 810.

When ADD is equal to ADD29', ADD30', . . . , or ADD34', a transmitting process of a control field is carried out at step 812.

When ADD is equal to ADD35', ADD36', . . . , or ADD44', a transmitting process of a message length field is carried out at step 814.

When ADD is equal to ADD45', ADD46', or the like a transmitting process of a data field is carried out at step 816.

A receiving mode is explained next with reference to FIGS. 9, 10, 11, 12, 13, 14 and 15.

Figure 9:
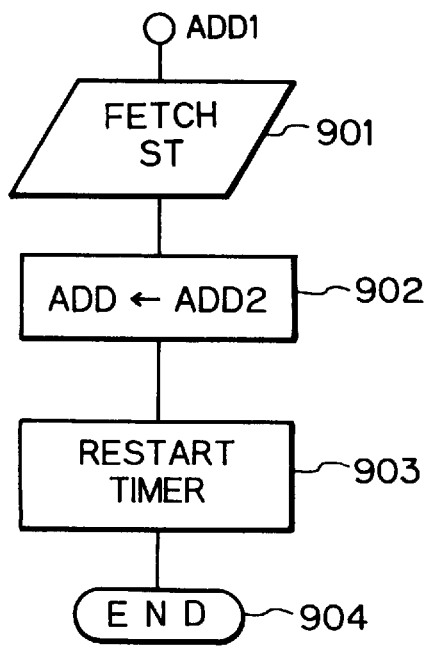

In FIG. 9, which is a detailed flowchart of step 804 of FIG. 8, at step 901, a start pulse ST is fetched from the filter 17 of FIG. 4. Next, at step 902, the address ADD is caused to be ADD2. Next, at step 903, the sampling time is set in the timer 19 and the timer 19 is restarted. Then, the routine of FIG. 8 is completed by step 904.

Figure 10:
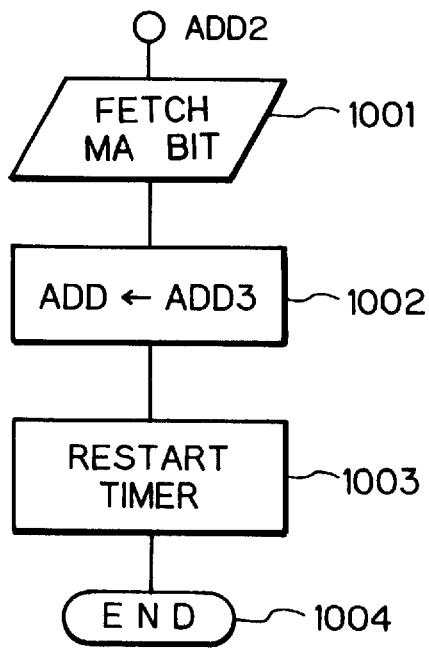

In FIG. 10, which is a detailed flowchart of step 805 of FIG. 8, at step 1001, a multiaddress (MA) bit is fetched from the filter 17 of FIG. 4. Next, at step 1002, the address ADD is caused to be ADD3. Next, at step 1003, the sampling time is set in the timer 19 and the timer 19 is restarted. Then, the routine of FIG. 8 is completed by step 1004.

Figure 11:
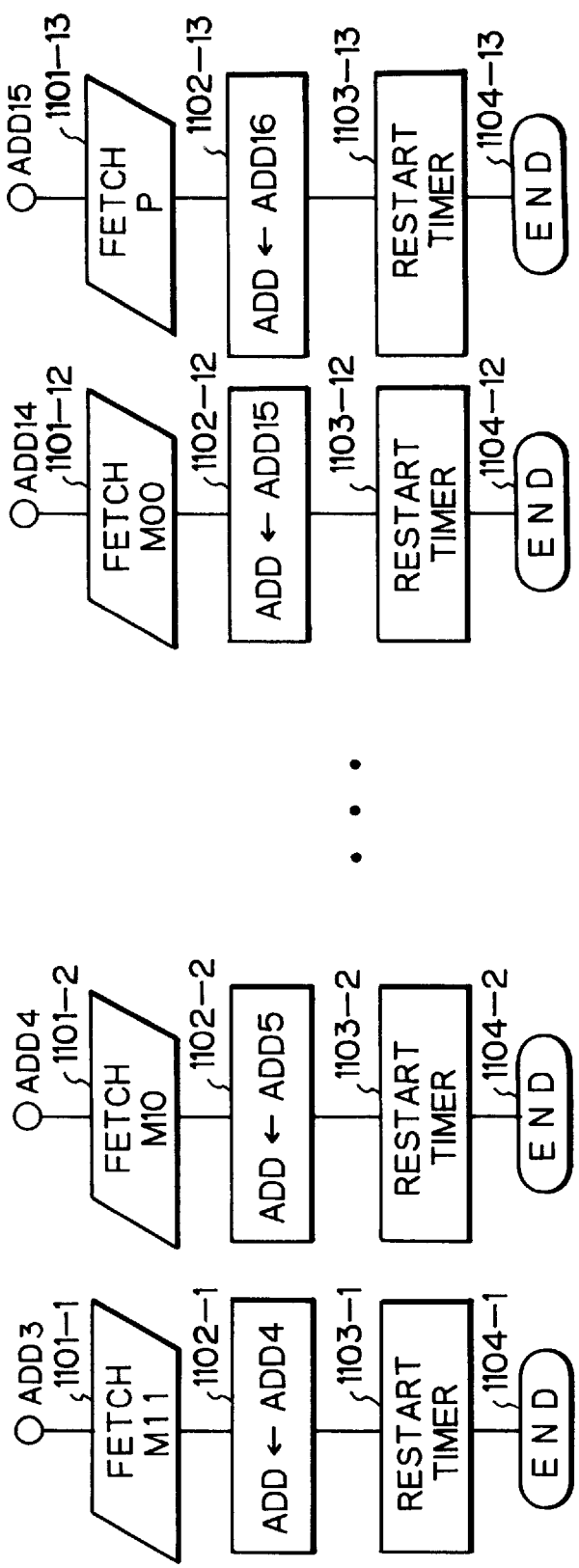

In FIG. 11, which is a detailed flowchart of step 807 of FIG. 8, If ADD=ADD3, at step 1101-1, a most significant bit (MSB) M11 of master address bits, which are in this case 12 bits, is fetched from the filter 17 of FIG. 4. Next, at step 1102-1, the address ADD is caused to be ADD4. Next, at step 1103-1, the sampling time is set in the timer 19 and the timer 19 is restarted. Then, the routine of FIG. 8 is completed by step 1104-1.

Also, if ADD=ADD4, at step 1101-2, a master address bit M10 is fetched from the filter 17 of FIG. 4. Next, at step 1102-2, the address ADD is caused to be ADD5. Next, at step 1103-2, the sampling time is set in the timer 19 and the timer 19 is restarted. Then, the routine of FIG. 8 is completed by step 1104-2.

Similarly, if ADD=ADD14, at step 1101-12, a least significant bit (LSB) M00 of the master address bits is fetched from the filter 17 of FIG. 4. Next, at step 1102-12, the address ADD is caused to be ADD15. Next, at step 1103-12, the sampling time is set in the timer 19 and the timer 19 is restarted. Then, the routine of FIG. 8 is completed by step 1104-12.

Further, if ADD=ADD15, at step 1101-13, a parity bit P of the master address bits is fetched from the filter 17 of FIG. 4. Next, at step 1102-13, the address ADD is caused to be ADD16. Next, at step 1103-13, the sampling time is set in the timer 19 and the timer 19 is restarted. Then, the routine of FIG. 8 is completed by step 1104-13.

Figure 12:
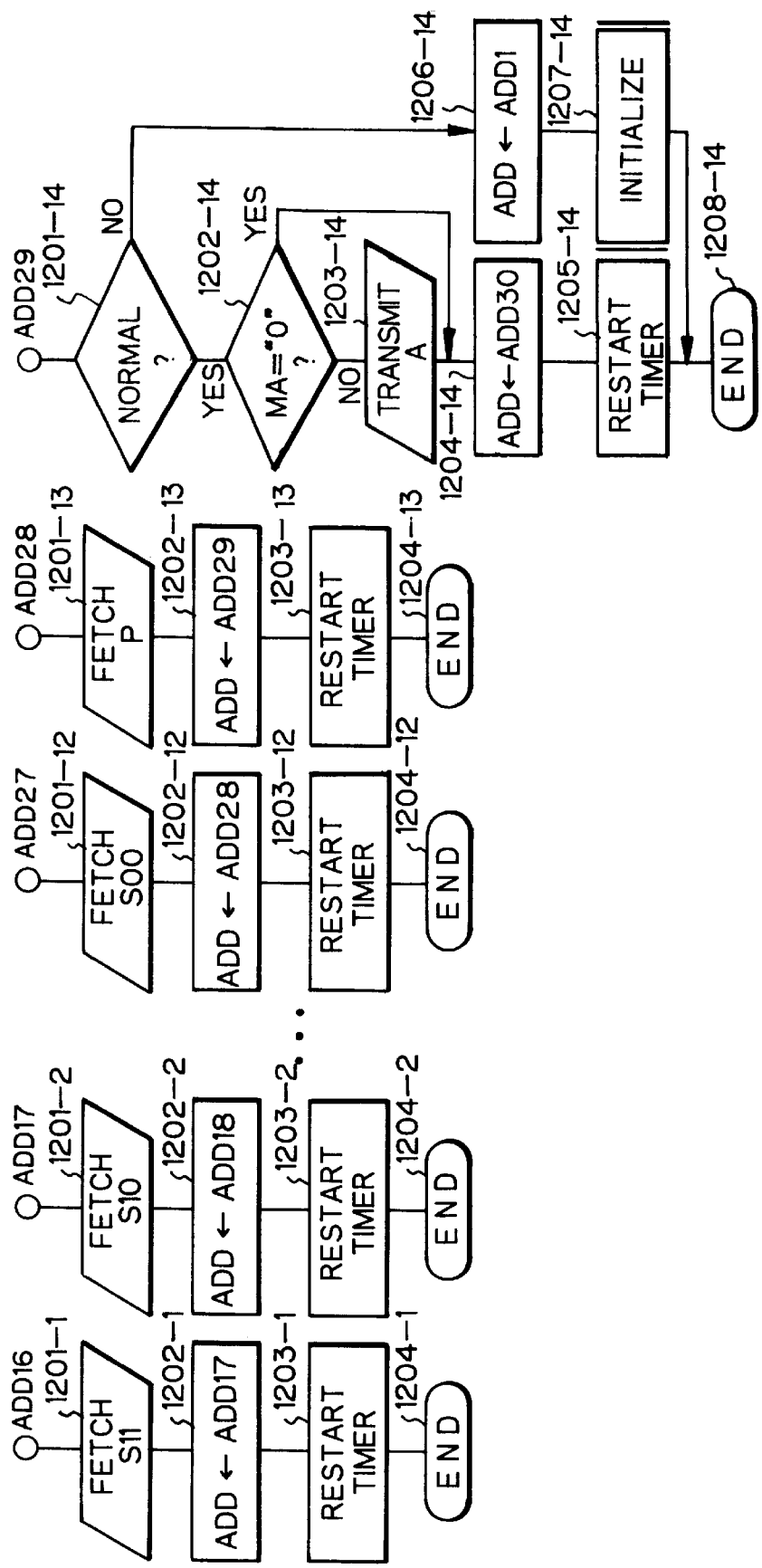

In FIG. 12, which is a detailed flowchart of step 809 of FIG. 8, if ADD=ADD16, at step 1201-1, an MSB S11 of slave address bits, which are in this case 12 bits, is fetched from the filter 17 of FIG. 4. Next, at step 1202-1, the address ADD is caused to be ADD17. Next, at step 1203-1, the sampling time is set in the timer 19 and the timer 19 is restarted. Then, the routine of FIG. 8 is completed by step 1204-1.

Also, if ADD=ADD17, at step 1201-2, a slave address bit S10 is fetched from the filter 17 of FIG. 4. Next, at step 1202-2, the address ADD is caused to be ADD18. Next, at step 1203-2, the sampling time is set in the timer 19 and the timer 19 is restarted. Then, the routine of FIG. 8 is completed by step 1204-2.

Similarly, if ADD=ADD27, at step 1201-12, an LSB S00 of the slave address bits is fetched from the filter 17 of FIG. 4. Next, at step 1202-12, the address ADD is caused to be ADD28. Next, at step 1203-12, the sampling time is set in the timer 19 and the timer 19 is restarted. Then, the routine of FIG. 8 is completed by step 1204-12.

Further, if ADD=ADD28, at step 1201-13, a parity bit P of the slave address bits is fetched from the filter 17 of FIG. 4. Next, at step 1202-13, the address ADD is caused to be ADD29. Next, at step 1203-13, the sampling time is set in the timer 19 and the timer 19 is restarted. Then, the routine of FIG. 8 is completed by step 1204-13.

In addition, if ADD=ADD29, at step 1201-14, it is determined whether or not the received master address bits M11 to M00 and the received slave address bits S11 to S00 are correct in accordance with their received parities P. Also, it is determined whether or not the received slave bits S11 to S00 indicate the address of this slave unit. As a result, only when the received master address bits and the received slave address bits are correct and the received slave address bits indicate the address of this slave unit, does the control proceed to step 1202-14. Otherwise, the control proceeds to step 1206-14. At step 1202-14, it is determined whether or not the received multiaddress (MA) bit is "0" (active). only when the multiaddress bit is "1", does the control proceed to step 1203-14. Otherwise, the control proceeds directly to step 1204-14. At step 1203-14, an acknowledgement bit A is transmitted via the serial interface 21 and the D2B transmitter 12 to the master unit. Next, at step 1204-14, the address ADD is caused to be ADD30. Then, at step 1205-14, the sampling time is set in the timer 19 and the timer 19 is restarted. On the other hand, at step 1206-14, the address ADD is caused to be ADD, and at step 1207-14, the edge detection interrupt operation is allowed and the timer interrupt operation is prohibited, thus initializing the receiving mode. Then, the routine of FIG. 8 is completed by step 1208-14.

Figure 13:
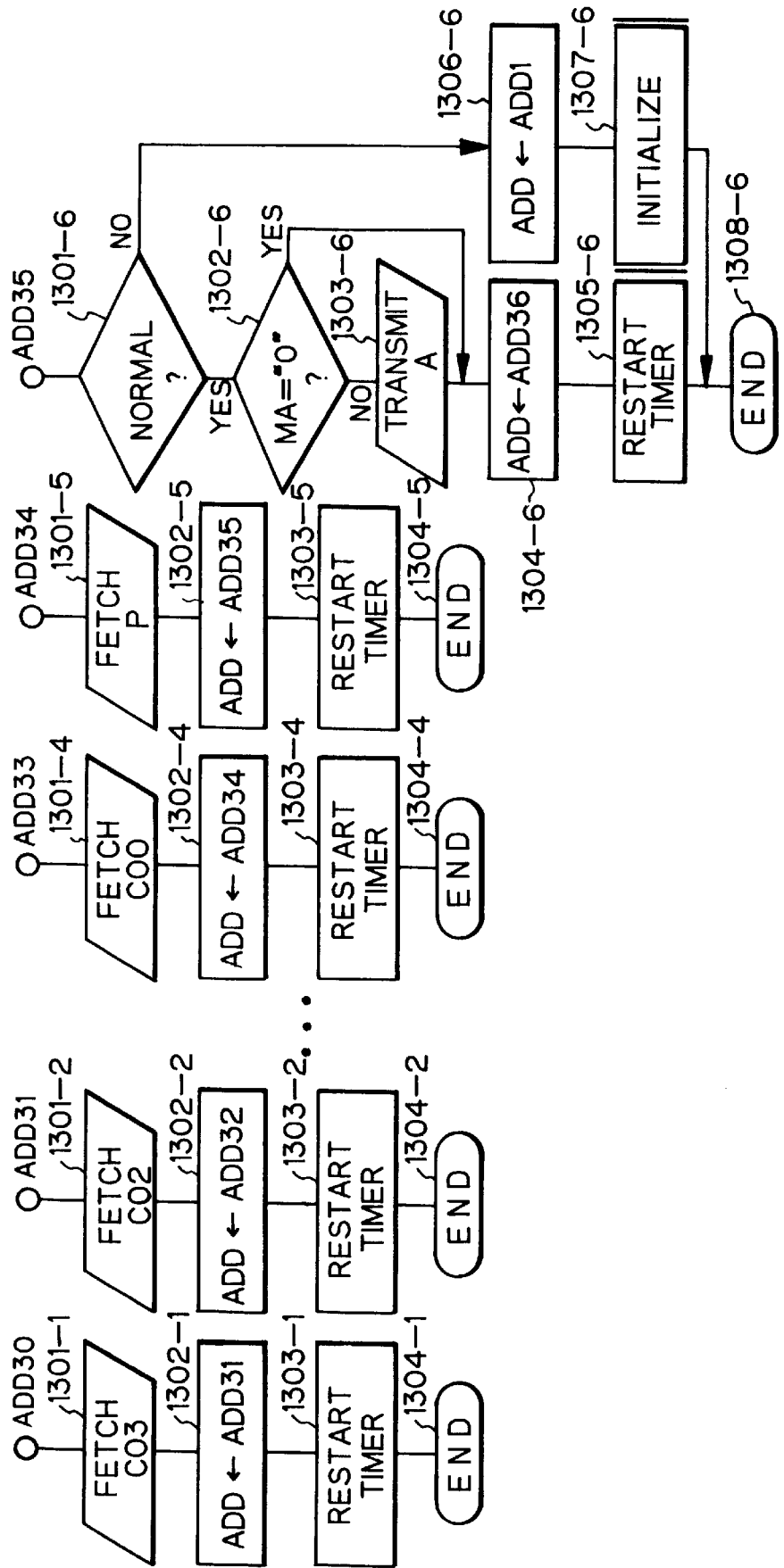

In FIG. 13, which is a detailed flowchart of step 811 of FIG. 8, if ADD=ADD30, at step 1301-1, an MSB C03 of control bits, which are in this case 4 bits, is fetched from the filter 17 of FIG. 4. Next, at step 1302-1, the address ADD is caused to be ADD31. Next, at step 1303-1, the sampling time is set in the timer 19 and the timer 19 is restarted. Then, the routine of FIG. 8 is completed by step 1304-1.

Also, if ADD=ADD31, at step 1301-2, a control bit C02 is fetched from the filter 17 of FIG. 4. Next, at step 1302-2, the address ADD is caused to be ADD32. Next, at step 1303-2, the sampling time is set in the timer 19 and the timer 19 is restarted. Then, the routine of FIG. 8 is completed by step 1304-2.

Similarly, if ADD=ADD33, at step 1301-4, an LSB C00 of the control bits is fetched from the filter 17 of FIG. 4. Next, at step 1302-4, the address ADD is caused to be ADD34. Next, at step 1303-4, the sampling time is set in the timer 19 and the timer 19 is restarted. Then, the routine of FIG. 8 is completed by step 1304-4.

Further, if ADD=ADD34, at step 1301-5, a parity bit P of the control bits is fetched from the filter 17 of FIG. 4. Next, at step 1302-5, the address ADD is caused to be ADD35. Next, at step 1303-5, the sampling time is set in the timer 19 and the timer 19 is restarted. Then, the routine of FIG. 8 is completed by step 1304-5.

In addition, if ADD=ADD35, at step 1301-6, it is determined whether or not the received control bits C03 to C00 are correct in accordance with their received parity P. As a result, only when the received control bits are correct, does the control proceed to step 1302-6. Otherwise, the control proceeds to step 1306-6. At step 1302-6, it is determined whether or not the received multiaddress (MA) bit is "0" (active). Only when the multiaddress bit is "1", does the control proceed to step 1303-6. Otherwise, the control proceeds directly to step 1304-6. At step 1303-6, an acknowledgement bit A is transmitted via the serial interface 21 and the D2B transmitter 12 to the master unit. Next, at step 1304-6, the address ADD is caused to be ADD36. Then, at step 1305-6, the sampling time is set in the timer 19 and the timer 19 is restarted. On the other hand, at step 1306-6, the address ADD is caused to be ADD1, and at step 1307-6, the edge detection interrupt operation is allowed and the timer interrupt operation is prohibited, thus initializing the receiving mode. Then, the routine of FIG. 8 is completed by step 1308-6.

Figure 14:
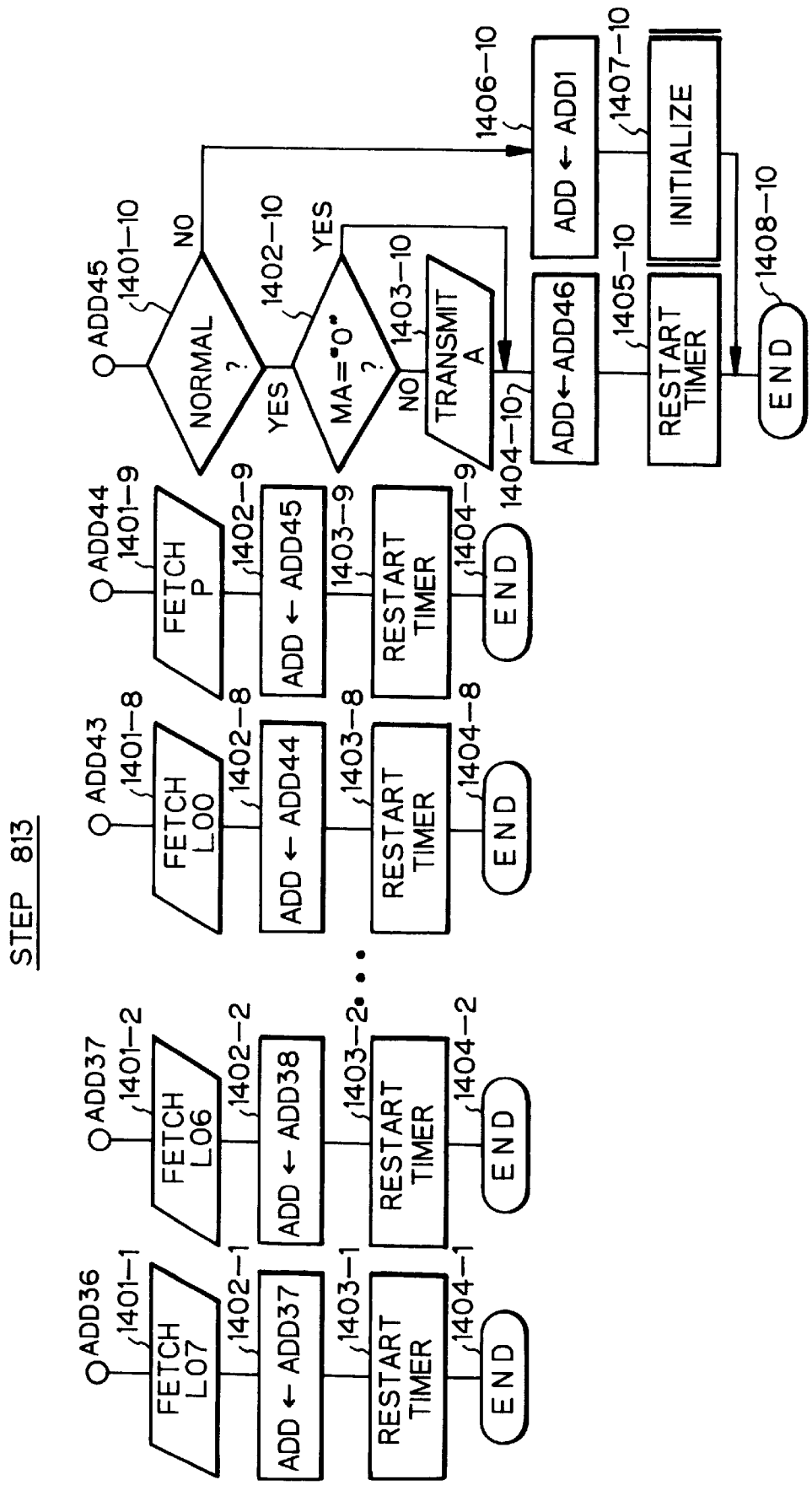

In FIG. 14, which is a detailed flowchart of step 813 of FIG. 8, if ADD=ADD36, at step 1401-1, an MSB L07 of message length bits, which are in this case 8 bits, is fetched from the filter 17 of FIG. 4. Next, at step 1402-1, the address ADD is caused to be ADD37. Next, at step 1403-1, the sampling time is set in the timer 19 and the timer 19 is restarted. Then, the routine of FIG. 8 is completed by step 1404-1.

Also, if ADD=ADD37, at step 1402-1, a message length bit L06 is fetched from the filter 17 of FIG. 4. Next, at step 1402-2, the address ADD is caused to be ADD38. Next, at step 1403-2, the sampling time is set in the timer 19 and the timer 19 is restarted. Then, the routine of FIG. 8 is completed by step 1404-2.

Similarly, if ADD=ADD43, at step 1401-8, an LSB L00 of the message length bits, is fetched from the filter 17 of FIG. 4. Next, at step 1402-8, the address ADD is caused to be ADD44. Next, at step 1403-8, the sampling time is set in the timer 19 and the timer 19 is restarted. Then, the routine of FIG. 8 is completed by step 1404-8.

Further, if ADD=ADD44, at step 1401-9, a parity bit P of the message length bits is fetched from the filter 17 of FIG. 4. Next, at step 1402-9, the address ADD is caused to be ADD45. Next, at step 1403-9, the sampling time is set in the timer 19 and the timer 19 is restarted. Then, the routine of FIG. 8 is completed by step 1404-9.

In addition, if ADD=ADD45, at step 1401-10, it is determined whether or not the received message length bits L07 to L00 are correct in accordance with its received parity P. As a result, only when the received message length bits are correct, does the control proceed to step 1402-10. Otherwise, the control proceeds to step 1406-10. At step 1402-10, it is determined whether or not the received multiaddress (MA) bit is "0" (active). only when the multiaddress bit is "1", does the control proceed to step 1403-10. Otherwise, the control proceeds directly to step 1404-10. At step 1403-10, an acknowledgement bit A is transmitted via the serial interface 21 and the D2B transmitter 12 to the master unit. Next, at step 1404-10, the address ADD is caused to be ADD46. Then, at step 1405-10, the sampling time is set in the timer 19 and the timer 19 is restarted. On the other hand, at step 1406-10, the address ADD is caused to be ADD1, and at step 1407-10, the edge detection interrupt operation is allowed and the timer interrupt operation is prohibited, thus initializing the receiving mode. Then, the routine of FIG. 8 is completed by step 1408-10.

Note that the message length bits (M07, M06, . . . , M00) define the number of bytes of data in the data field as follows:

| MESSAGE LENGTH L | NUMBER OF BYTES |
|---|---|
| 01$_H$ | 1 |
| 02$_H$ | 2 |
| . | . |
| . | . |
| . | . |
| FF$_H$ | 255 |
| 00$_H$ | 256 |

Figure 15:
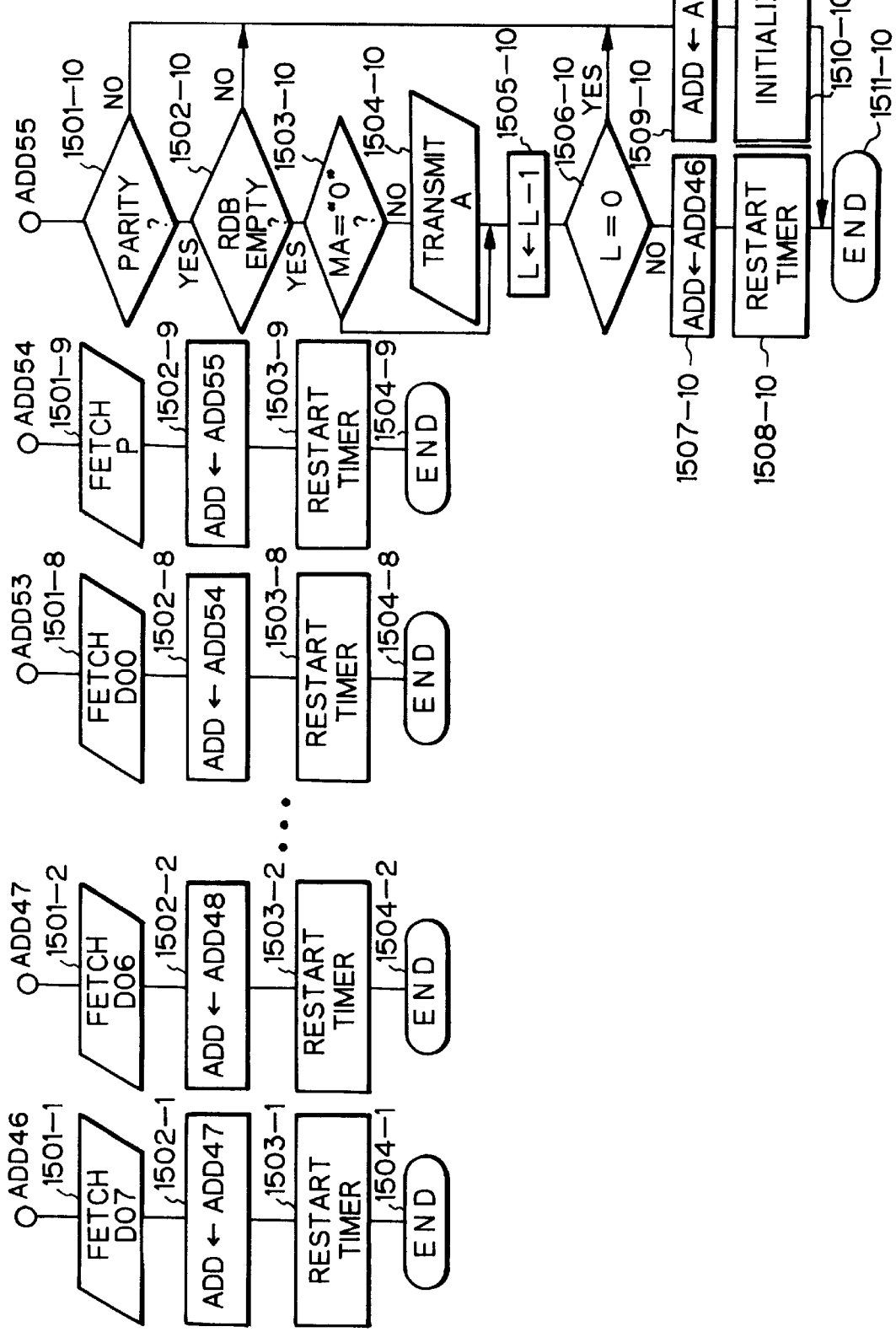

In FIG. 15, which is a detailed flowchart of step 815 of FIG. 8, if ADD=ADD46, at step 1501-1, an MSB D07 of a one-byte data is fetched from the filter 17 of FIG. 4. Next, at step 1502-1, the address ADD is caused to be ADD47. Next, at step 1503-1, the sampling time is set in the timer 19 and the timer 19 is restarted. Then, the routine of FIG. 8 is completed by step 1504-1.

Also, if ADD=ADD47, at step 1501-2, a second bit D06 of the one-byte data is fetched from the filter 17 of FIG. 4. Next, at step 1502-2, the address ADD is caused to be ADD48. Next, at step 1503-2, the sampling time is set in the timer 19 and the timer 19 is restarted. Then, the routine of FIG. 8 is completed by step 1504-2.

Similarly, if ADD=ADD53, at step 1501-8, an LSB D00 of the one-byte data is fetched from the filter 17 of FIG. 4. Next, at step 1502-8, the address ADD is caused to be ADD54. Next, at step 1503-12, the sampling time is set in the timer 19 and the timer 19 is restarted. Then, the routine of FIG. 8 is completed by step 1504-8.

Further, if ADD=ADD54, at step 1501-9, a parity bit P of the one-byte data is fetched from the filter 17 of FIG. 4. Next, at step 1502-9, the address ADD is caused to be ADD55. Next, at step 1503-9, the sampling time is set in the timer .19 and the timer 19 is restarted. Then, the routine of FIG. 8 is completed by step 1504-9.

In addition, if ADD=ADD55, at step 1501-10, it is determined whether or not the received one-byte data bits D07 to D00 are correct in accordance with its received parity P. As a result, only when the received data bits are correct, does the control proceed to step 1502-10. Otherwise, the control proceeds to step 1509-10.

At step 1502-10, it is determined whether or not the read data buffer 31 of FIG. 4 is empty. Only when the read data buffer 31 is empty, does the control proceed to step 1503-10. Otherwise, the control proceeds to step 1509-10. At step 1503-10, it is determined whether or not the received multiaddress (MA) bit is "0" (active). Only when the multiaddress bit is "1", does the control proceed to step 1504-10. Otherwise, the control proceeds directly to step 1505-10. At step 1504-10, an acknowledgement bit A is transmitted via the serial interface 21 and the D2B transmitter 12 to the master unit. At step 1505-10, the received number L of bytes is counted down by 1, i.e.,

L←L−1

Then, at step 1505-11, it is determined whether or not the number L has reached 0. Only when L reaches 0, does the control proceed to step 1509-10. Otherwise, the control proceeds to step 1507-10. At step 1507-10, the address ADD is caused to be ADD30. Then, at step 1508-10, the sampling time is set in the timer 19 and the timer 19 is restarted. On the other hand, at step 1509-10, the address ADD is caused to be ADD1, and at step 1510-10, the edge detection interrupt operation is allowed and the timer interrupt operation is prohibited, thus initializing the receiving mode. Then, the routine of FIG. 8 is completed by step 1511-11.

A transmitting mode will be explained next with reference to FIGS. 16, 7, 17, 18A, 18B, 18C, 18D, 19, 20, 21 and 22.

Figure 16:
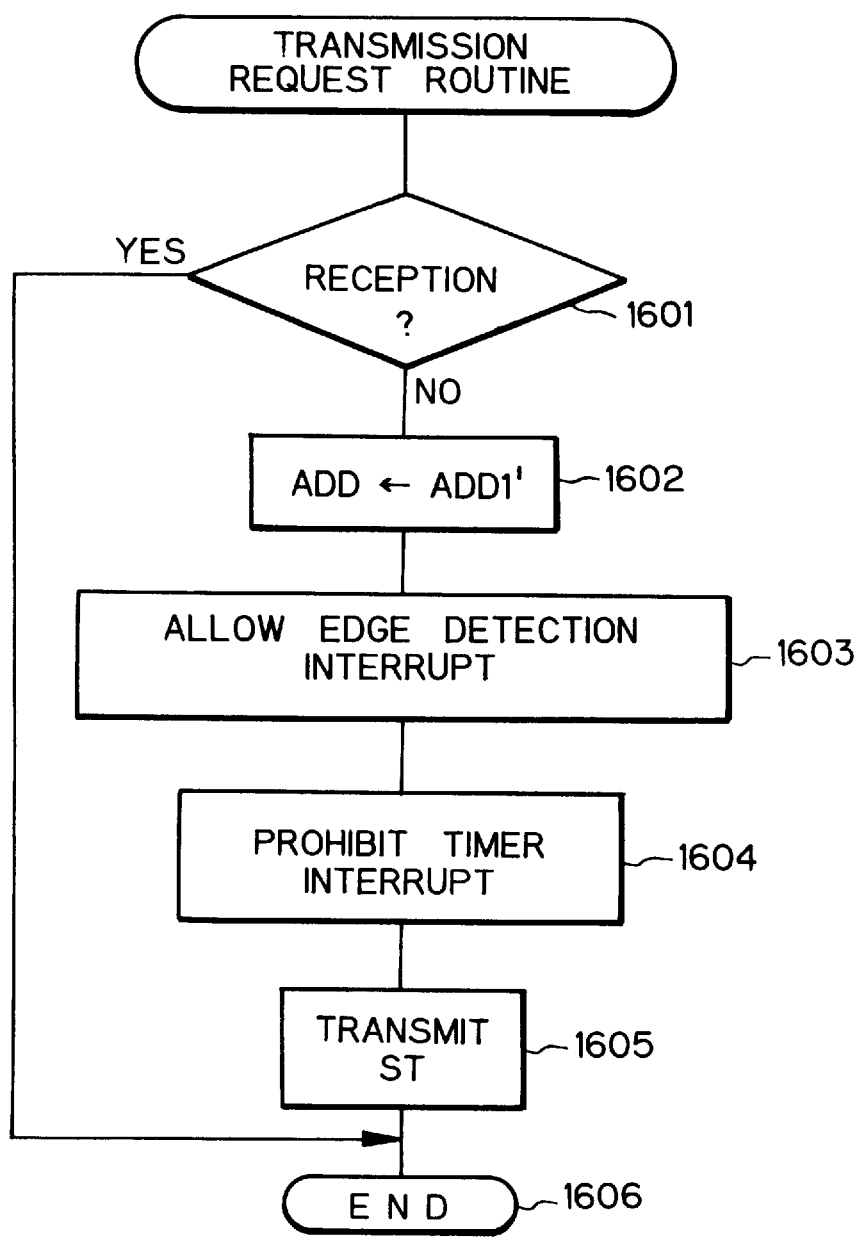

In FIG. 16, which is a transmission request routine, this routine is carried out when data to be transmitted is written into the write data buffer 32 of FIG. 4.

At step 1601, it is determined whether or not the serial data transmission apparatus 1' is currently in a receiving mode. Note that, if the serial data transmission apparatus 1' of FIG. 4 is in a receiving mode, the address ADD is ADD2, ADD3, . . . , or ADD55. Therefore, at step 1601, it is determined whether or not the address ADD is one of ADD2, ADD3, . . . , and ADD55. Unless the address ADD is one of ADD2, ADD3, . . . , and ADD55, the control proceeds to steps 1602, 1603 and 1604. If the address ADD is one of ADD2, ADD3, . . . , and ADD55, the control proceeds directly to step 1606.

At step 1602, ADD1' is set in the address ADD.

Next, at step 1603, the edge detection interrupt operation is allowed, while, at step 1604, the timer interrupt operation is prohibited.

Next, at step 1605, a start pulse ST is transmitted to the D2B bus 2.

Then, the routine of FIG. 16 is completed by step 1606.

After the edge detection interrupt operation is allowed at step 1603 and the start pulse signal ST is transmitted from the D2B transmitter 12 of the serial data transmission apparatus 1' to the D2B bus 2, the start pulse ST is received by the D2B receiver 11 of the serial data transmission apparatus 1' per se. As a result, the edge detection interrupt routine shown in FIG. 7 is carried out. That is, the control proceeds via step 701 to step 702. At step 702, a sampling time to be set in the timer 19 is calculated. Then, at step 703, the sampling time is set in the timer 19, and the timer 19 is started. Next, at step 704, the edge detection interrupt operation is prohibited, while, at step 705, the timer interrupt operation is allowed. The edge detection interrupt routine of FIG. 7 is completed by step 706. Thus, the timer interrupt routine shown in FIG. 8 can be substantially carried out on the condition that ADD=ADD1'.

Figure 17:
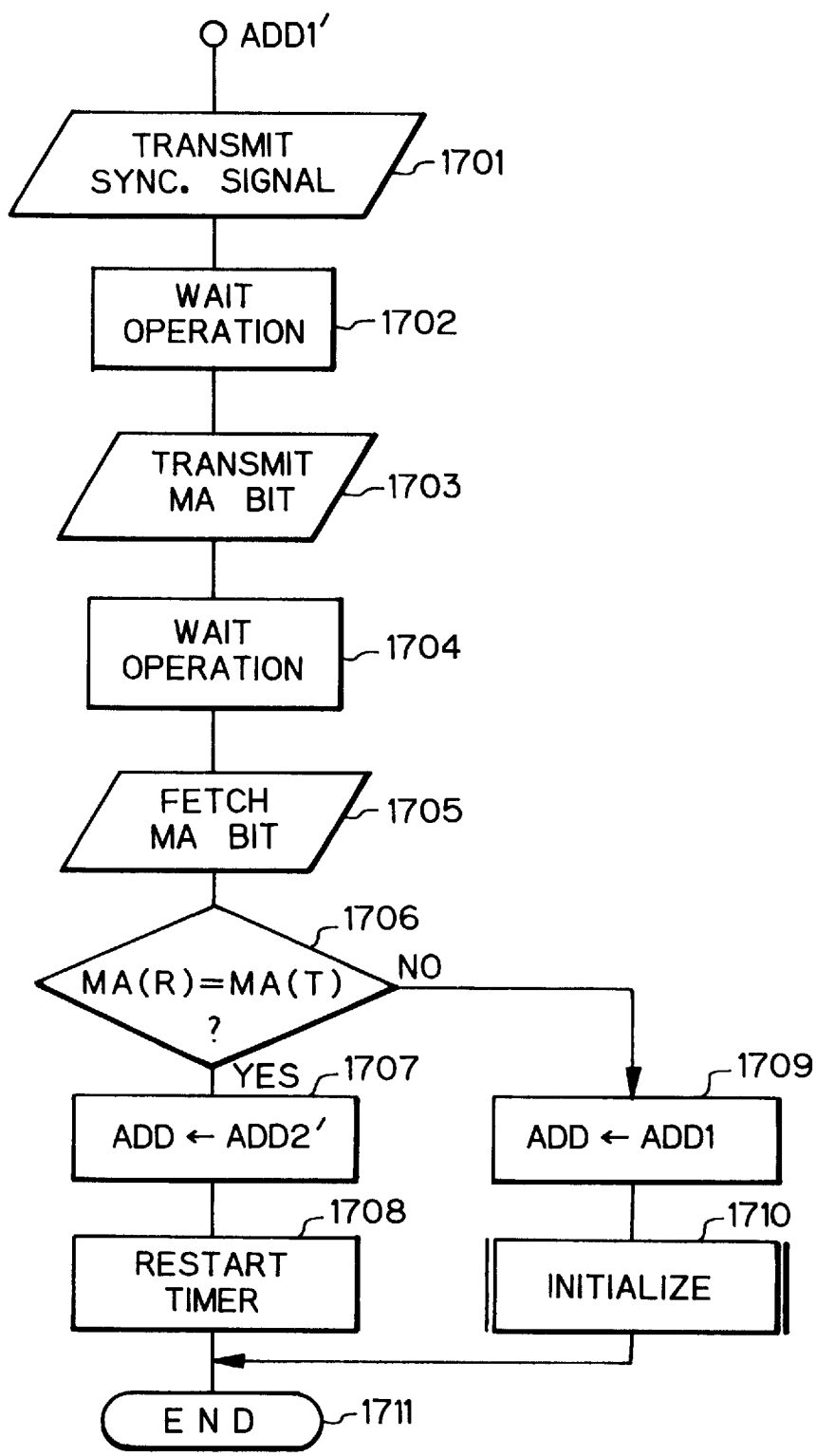
Figure 18A:
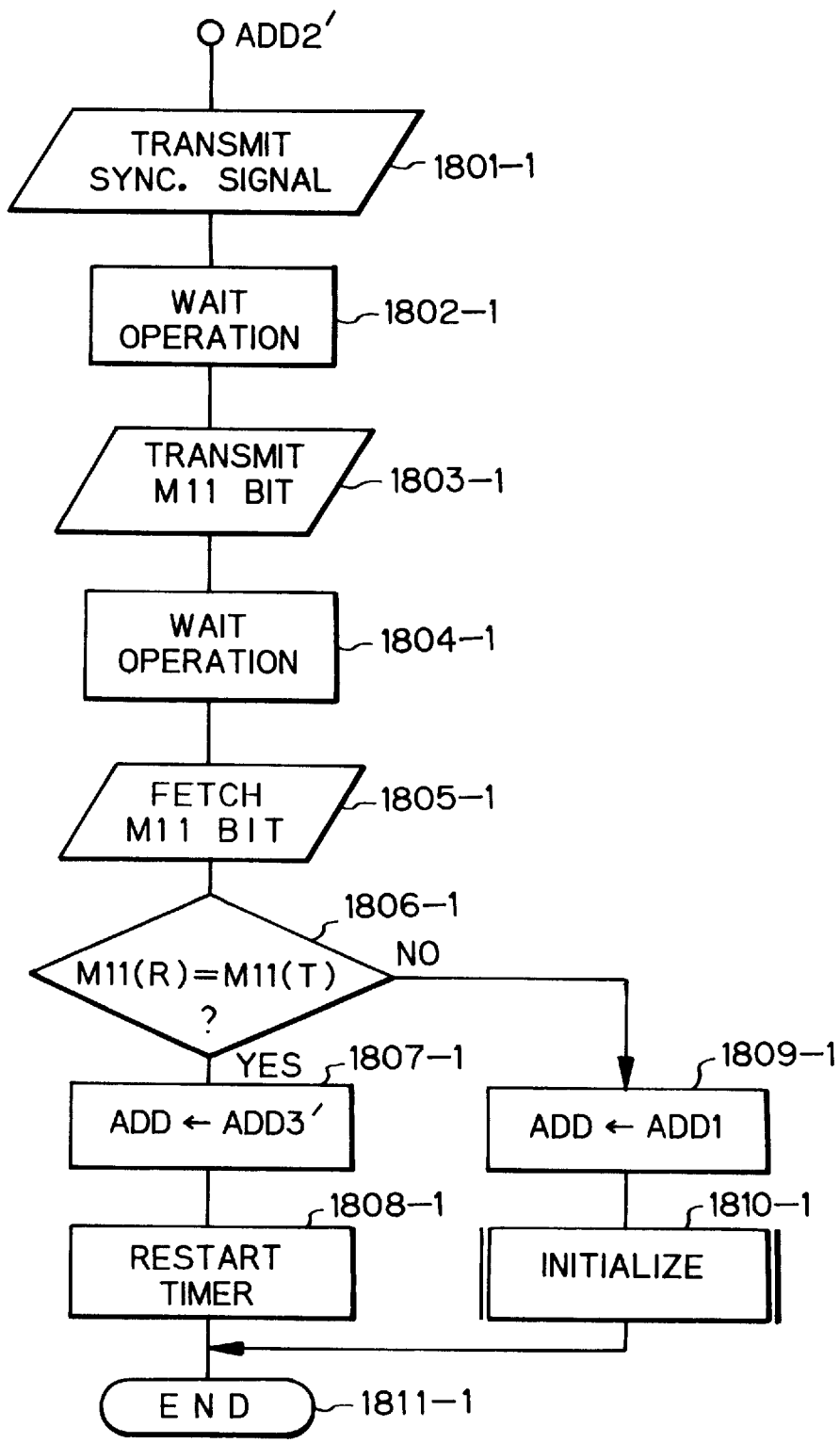
Figure 18B:
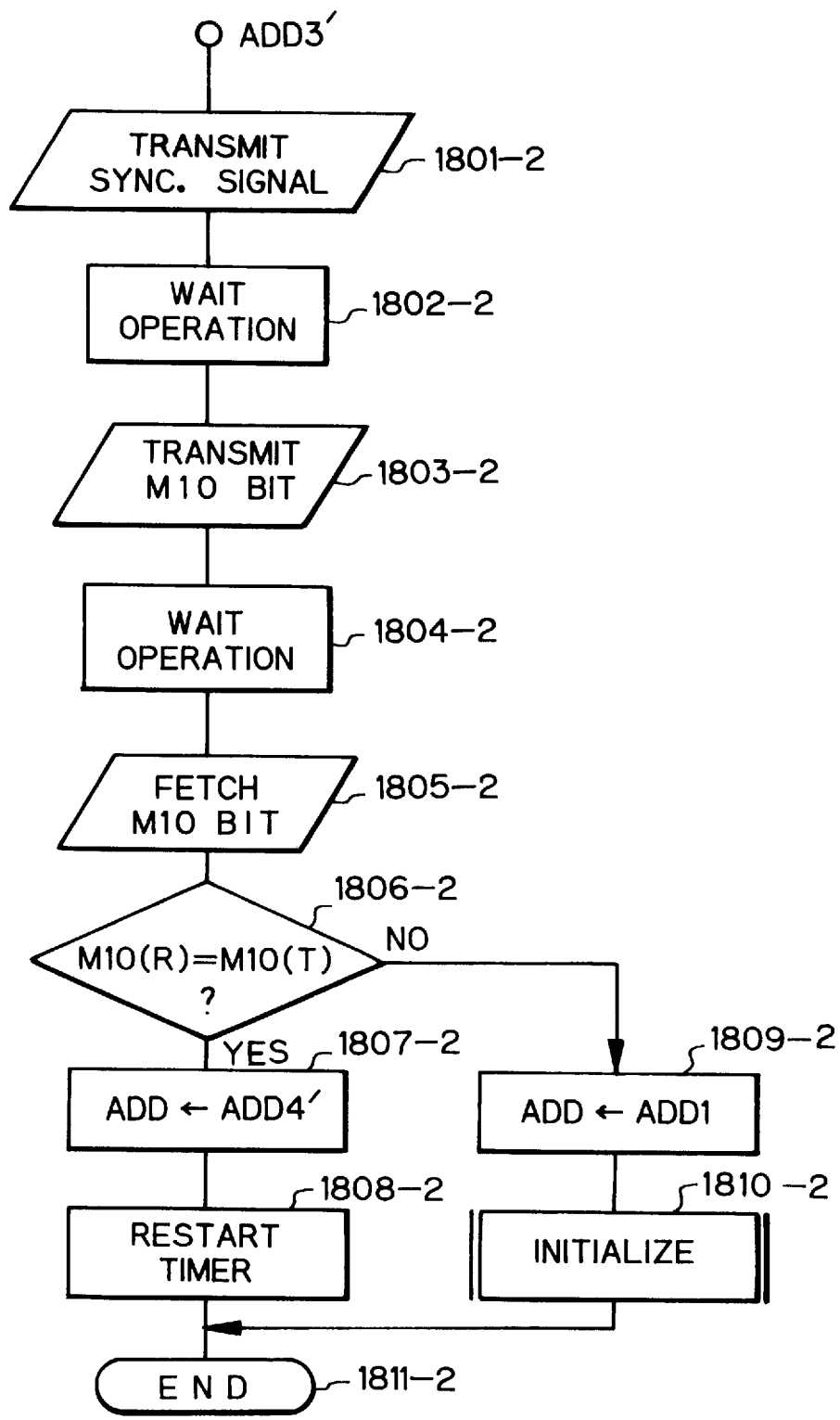
Figure 18C:
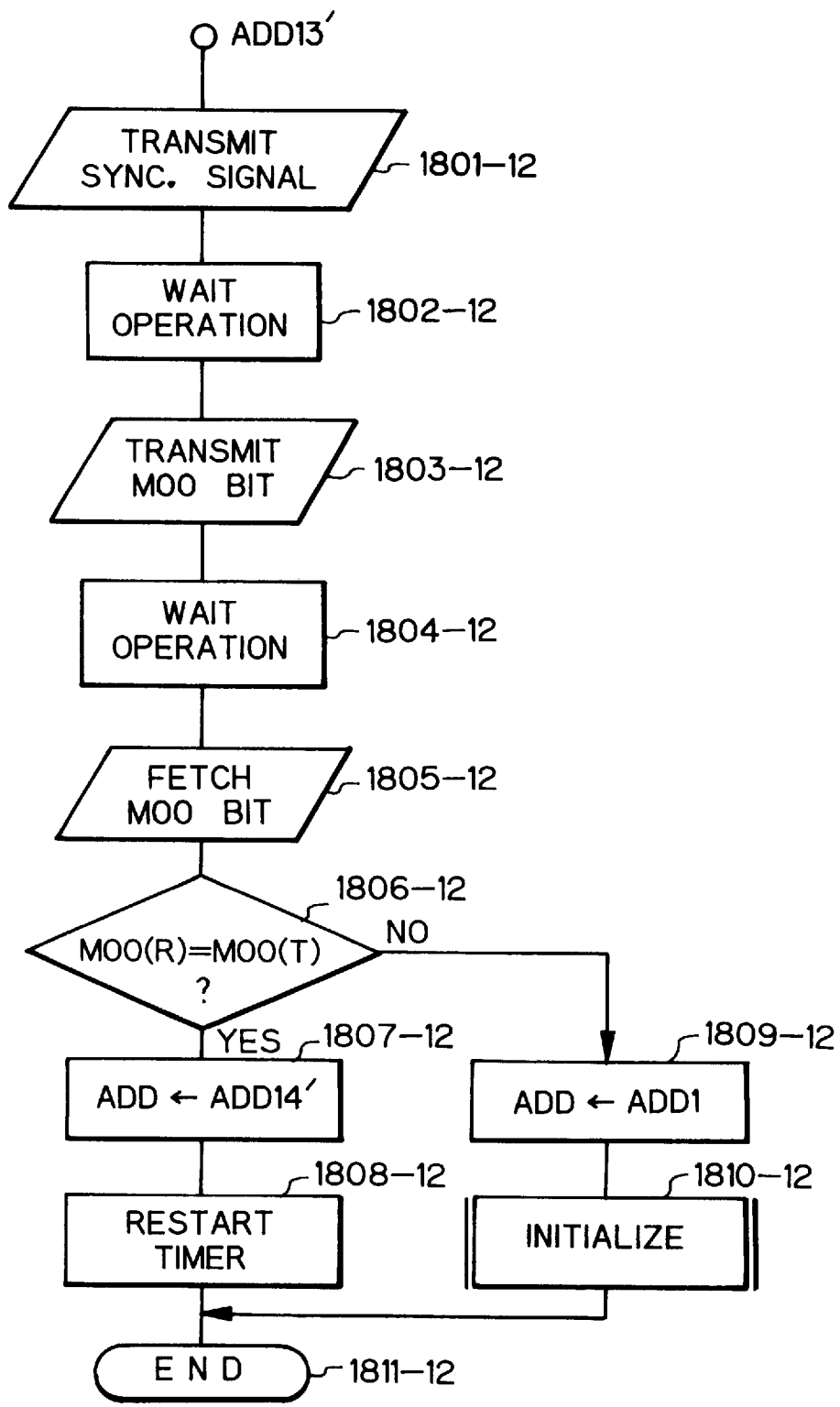
Figure 18D:
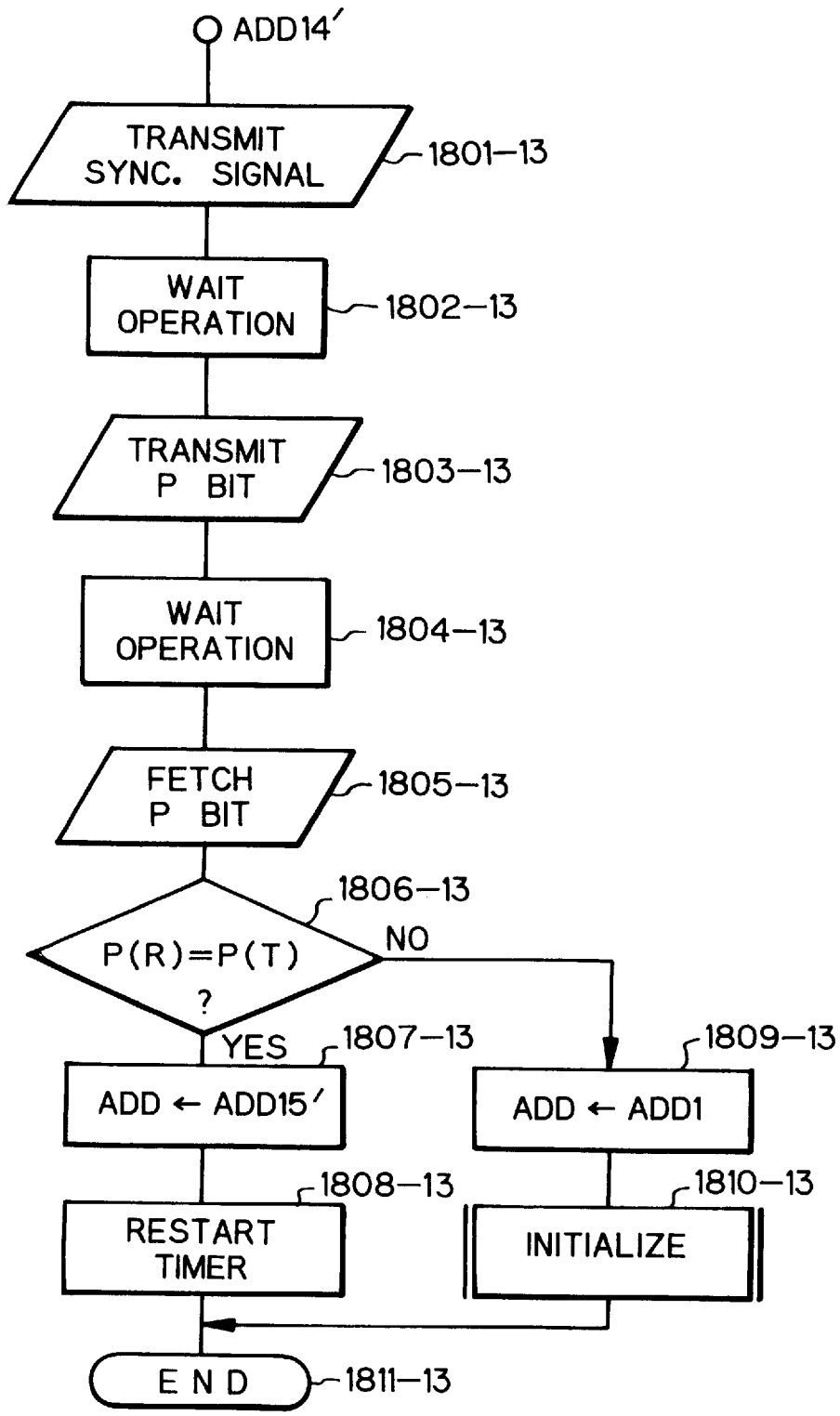

In FIG. 17, which is a detailed flowchart of step 806, at step, 1701, a synchronization signal is transmitted to the D2B bus 2, and at step 1702, a wait operation is carried out to maintain the synchronization signal for a synchronization period (see FIG. 6). Then, at step, 1703, a multiaddress bit signal MA(T) is transmitted to the D2B bus 2, and at step 1704, a wait operation is carried out to maintain the multiaddress bit signal for a wait period TD. Then, at step 1705, a signal MA(R) is fetched from the filter 17 of FIG. 4.

Next, at step 1706, it is determined whether or not the received signal MA(R) coincides with the multiaddress signal MA(T). As a result, only when MA(R)=MA(T), so that the multiaddress signal MA(T) is securely on the D2B bus 2, does the control proceed to steps 1707 and 1708. Otherwise, the control proceeds to steps 1709 and 1710.

At step 1707, the address ADD is caused to be ADD2'. Then, at step 1708, the sampling time is set in the timer 19 and the timer 19 is restarted.

On the other hand, at step 1709, the address ADD is caused to be ADD1, and at step 1710, the edge detection interrupt operation is allowed and the timer interrupt operation is prohibited, thus changing the transmitting mode into a standby state for a receiving mode.

The routine of FIG. 8 is completed by step 1711.

FIGS. 18A, 18B, 18C and 18D are detailed flowcharts of step 808 of FIG. 8.

If ADD=ADD2', at step, 1801-1, a synchronization signal is transmitted to the D2B bus 2, and at step 1802-1, a wait operation is carried out to maintain the synchronization signal for a synchronization period (see FIG. 6). Then, at step, 1803-1, an MSB M11 of master address bits is transmitted to the D2B bus 2, and at step 1804-1, a wait operation is carried out to maintain the MSB M11 for a wait period TD. Then, at step 1805-1, a signal M11(R) is fetched from the filter 17 of FIG. 4.

Next, at step 1806-1, it is determined whether or not the received signal M11(R) coincides with the MSB M11(T). As a result, only when M11(R)=M11(T), so that the MSB M11(T) is securely on the D2B bus 2, does the control proceed to steps 1807-1 and 1808-1. Otherwise, the control proceeds to steps 1809-1 and 1810-1.

At step 1807-1, the address ADD is caused to be ADD3'. Then, at step 1808-1, the sampling time is set in the timer 19 and the timer 19 is restarted.

On the other hand, at step 1809-1, the address ADD is caused to be ADD1, and at step 1810-1, the edge detection interrupt operation is allowed and the timer interrupt operation is prohibited, thus changing the transmitting mode into a standby state for a receiving mode.

The routine of FIG. 8 is completed by step 1811-1.

Also, if ADD=ADD3', at step 1801-2, a synchronization signal is transmitted to the D2B bus 2, and at step 1802-2, a wait operation is carried out to maintain the synchronization signal for a synchronization period (see FIG. 6). Then, at step, 1803-2, a master address bit M10 is transmitted to the D2B bus 2, and at step 1804-2, a wait operation is carried out to maintain the master address bit M10 for a wait period TD. Then, at step 1805-2, a signal M10(R) is fetched from the filter 17 of FIG. 4.

Next, at step 1806-2, it is determined whether or not the received signal M10(R) coincides with the master address bit M10(T). As a result, only when M10(R)=M10(T), so that the master address bit M10(T) is securely on the D2B bus 2, does the control proceed to steps 1807-2 and 1808-2. Otherwise, the control proceeds to steps 1809-2 and 1810-2.

At step 1807-2, the address ADD is caused to be ADD4'. Then, at step 1808-2, the sampling time is set in the timer 19 and the timer 19 is restarted.

On the other hand, at step 1809-2, the address ADD is caused to be ADD1, and at step 1810-2, the edge detection interrupt operation is allowed and the timer interrupt operation is prohibited, thus changing the transmitting mode into a standby state for a receiving mode.

The routine of FIG. 8 is completed by step 1811-2.

Further, if ADD=ADD13', at step 1801-12, a synchronization signal is transmitted to the D2B bus 2, and at step 1802-12, a wait operation is carried out to maintain the synchronization signal for a synchronization period (see FIG. 6). Then, at step, 1803-12, an LSB M00 of the master address bits is transmitted to the D2B bus 2, and at step 1804-12, a watt operation is carried out to maintain the LSB M00 for a wait period TD. Then, at step 1805-12, a signal M00(R) is fetched from the filter 17 of FIG. 4.

Next, at step 1806-2, it is determined whether or not the received signal M00(R) coincides with the LSB M00(T). As a result, only when M00(R)=M00(T), so that the LSB M00(T) is securely on the D2B bus 2, does the control proceed to steps 1807-12 and 1808-12. Otherwise, the control proceeds to steps 1809-12 and 1810-12.

At step 1807-12, the address ADD is caused to be ADD14'. Then, at step 1808-12, the sampling time is set in the timer 19 and the timer 19 is restarted.

On the other hand, at step 1809-12, the address ADD is caused to be ADD1, and at step 1810-12, the edge detection interrupt operation is allowed and the timer interrupt operation is prohibited, thus changing the transmitting mode into a standby state for a receiving mode.

The routine of FIG. 8 is completed by step 1811-12.

In addition, if ADD=ADD14', at step, 1801-13, a synchronization signal is transmitted to the D2B bus 2, and at step 1802-13, a wait operation is carried out to maintain the synchronization signal for a synchronization period (see FIG. 6). Then, at step, 1803-13, a parity bit P of the master address bits is transmitted to the D2B bus 2, and at step 1804-12, a wait operation is carried out, to maintain the parity bit P for a wait period TD. Then, at step 1805-13, A signal P(R) is fetched from the filter 17 of FIG. 4.

Next, at step 1806-13, it is determined whether or not the received signal P(R) coincides with the parity bit P(T). As a result, only when P(R)=P(T), so that the parity bit P(T) is securely on the D2B bus 2, does the control proceed to steps 1807-13 and 1808-13. Otherwise, the control proceeds to steps 1809-13 and 1810-13.

At step 1807-13, the address ADD is caused to be ADD15'. Then, at step 1808-13, the sampling time is set in the timer 19 and the timer 19 is restarted.

On the other hand, at step 1809-13, the address ADD is caused to be ADD1, and at step 1810-13, the edge detection interrupt operation is allowed and the timer interrupt operation is prohibited, thus changing the transmitting mode into a standby state for a receiving mode.

The routine of FIG. 8 is completed by step 1811-13.

Note that, in FIGS. 17, 18A, 18B, 18C and 18D, the wait time TD of the wait operation at step 1704, 1804-1, 1804-2, ..., 1804-12 and 1804-13 is represented by $$TD=2ab/(1-a)+(1+a)(1T_d+2T_t+T_r)+T_f$$

where a is an accuracy of a frequency;
b is a synchronization time period;
$T_d$ is a delay time of the D2B transmitter 12;
$T_t$ is a delay time of the D2B bus 2;
$T_r$ is a delay time of the D2B receiver 11; and
$T_f$ is a delay time of the filter 17.

Therefore, if a=0.05%, B=20 μs, $T_d$=1.6 μs, $T_t$=0.9 μs, $T_r$=0.75 μs, and $T_f$=0.5 μs, then TD is 9 μs.

In FIG. 19, which is a detailed flowchart of step 810 of FIG. 8, if ADD=ADD15', at step 1901-1, an MSB S11 of slave address bits, which are in this case 12 bits, is transmitted via the serial interface 21 and the D2B transmitter 12 to the D2B bus 2. Next, at step 1902-1, the address ADD is caused to be ADD16'. Next, at step 1903-1, the sampling time is set in the timer 19 and the timer 19 is restarted. Then, the routine of FIG. 8 is completed by step 1904-1.

Note that, if the bit S11 is "0", the serial interface 21 is set so that the synchronization signal and the data signal are both "0" (see FIG. 6), while, if the bit S11 is "1", the serial interface 21 is set so that the synchronization signal is "0" and the data signal is "1" (see FIG. 6).

Also, if ADD=ADD16', at step 1901-2, a slave address bit S10 is transmitted via the serial interface 21 and the D2B transmitter 12 to the D2B bus 2. Next, at step 1902-2, the address ADD is caused to be ADD17'. Next, at step 1903-2, the sampling time is set in the timer 19 and the timer 19 is restarted. Then, the routine of FIG. 8 is completed by step 1904-2.

Similarly, if ADD=ADD26', at step 1901-12, an LSB S00 of the slave address bits is transmitted via the serial interface 21 and the D2B transmitter 12 to the D2B bus 2. Next, at step 1902-12, the address ADD is caused to be ADD27'. Next, at step 1903-12, the sampling time is set in the timer 19 and the timer 19 is restarted. Then, the routine of FIG. 8 is completed by step 1904-12.

Further, if ADD=ADD27', at step 1901-13, a parity bit P of the slave address bits is transmitted via the serial interface 21 and the D2B transmitter 12 to the D2B bus 2. Next, at step 1902-13, the address ADD is caused to be ADD28'. Next, at step 1903-13, the sampling time is set in the timer 19 and the timer 19 is restarted. Then, the routine of FIG. 8 is completed by step 1904-13.

In addition, if ADD=ADD28', at step 1901-14, it is determined whether or not the transmitted multiaddress (MA) bit is "0" (active). Only when the multiaddress bit is "1", does the control proceed to step 1902-14. Otherwise, the control proceeds directly to step 1902-14. At step 1902-14, the acknowledgement bit A from the slave unit is fetched, and at step 1903-14, it is determined whether or not the acknowledgement bit is "0" (active). Only when the acknowledgement bit A is "0", does the control proceed to steps 1904-14 and 1905-14. Otherwise, the control proceeds to steps 1906-14 and 1907-14. At step 1904-14, the address ADD is caused to be ADD29'. Then, at step 1905-14, the sampling time is set in the timer 19 and the timer 19 is restarted. On the other hand, at step 1906-14, the address ADD is caused to be ADD1, and at step 1907-14, the edge detection interrupt operation is allowed and the timer interrupt operation is prohibited, thus changing the transmitting mode into a standby state for a receiving mode. Then, the routine of FIG. 8 is completed by step 1908-14.

Figure 20:
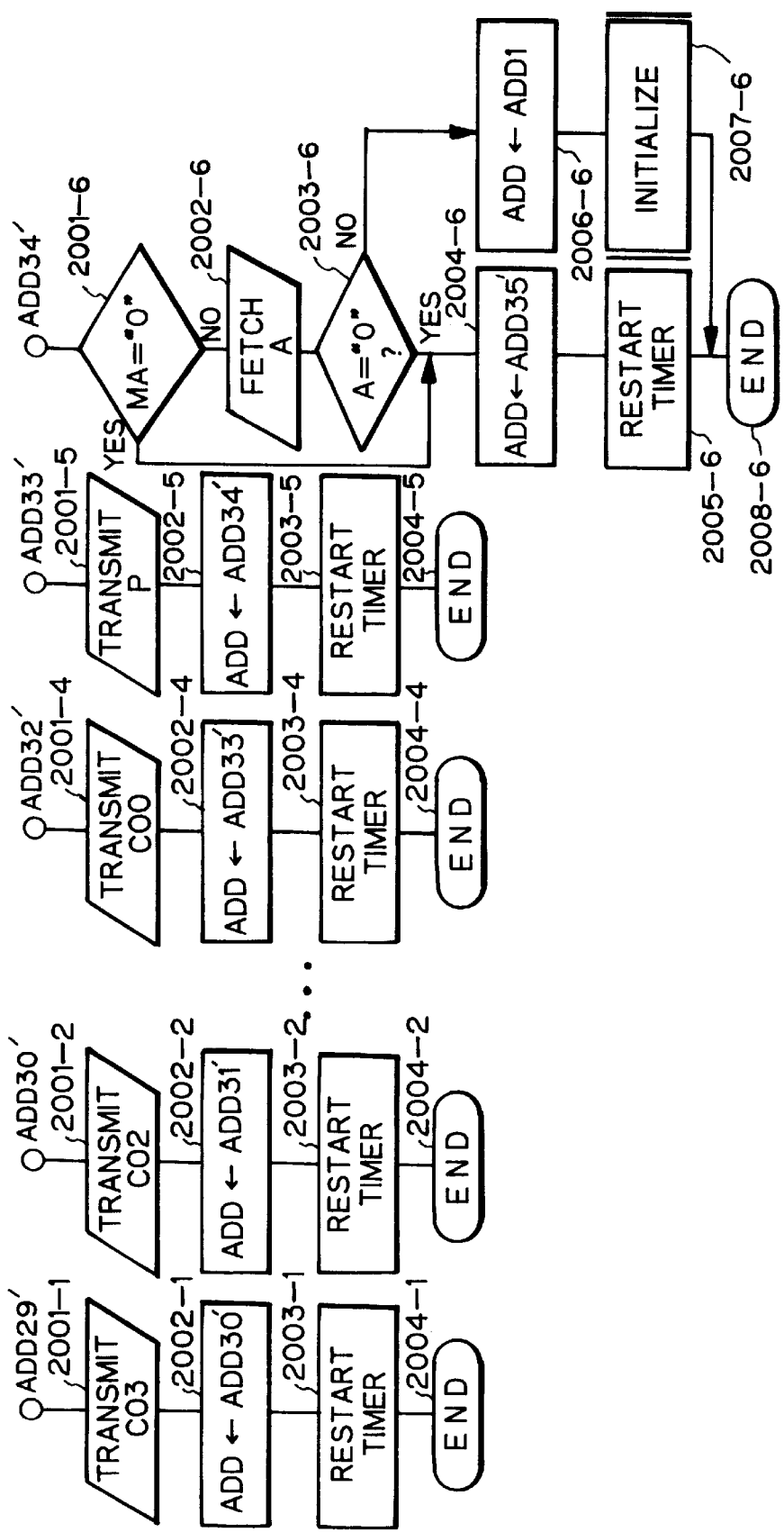

In FIG. 20, which is a detailed flowchart of step 812 of FIG. 8, if ADD=ADD29', at step 2001-1, an MSB C03 of control bits, which are in this case 4 bits, is transmitted via the serial interface 21 and the D2B transmitter 12 to the D2B bus 2. Next, at step 2002-1, the address ADD is caused to be ADD30'. Next, at step 2003-1, the sampling time is set in the timer 19 and the timer 19 is restarted. Then, the routine of FIG. 8 is completed by step 2004-1.

Also, if ADD=ADD30', at step 2001-2, a control bit C02 is transmitted via the serial interface 21 and the D2B transmitter 12 to the D2B bus 2. Next, at step 2002-2, the address ADD is caused to be ADD31'. Next, at step 2003-2, the sampling time is set in the timer 19 and the timer 19 is restarted. Then, the routine of FIG. 8 is completed by step 2004-2.

Similarly, if ADD=ADD32', at step 2001-4, an LSB C00 of the control bits, is transmitted via the serial interface 21 and the D2B transmitter 12 to the D2B bus 2. Next, at step 2002-4, the address ADD is caused to be ADD33'. Next, at step 2003-4, the sampling time is set in the timer 19 and the timer 19 is restarted. Then, the routine of FIG. 8 is completed by step 2004-4.

Further, if ADD=ADD33', at step 2001-5, a parity bit P of the control bits is transmitted via the serial interface 21 and the D2B transmitter 12 to the D2B bus 2. Next, at step 2002-5, the address ADD is caused to be ADD34'. Next, at step 2003-4, the sampling time is set in the timer 19 and the timer 19 is restarted. Then, the routine of FIG. 8 is completed by stop 2004-4.

In addition, if ADD=ADD34', at step 2001-6, it is determined whether or not the transmitted multiaddress (MA) bit is "0" (active). Only when the multiaddress bit is "1", does the control proceed to step 2002-6. Otherwise, the control proceeds directly to step 2002-6. At step 2002-6, the acknowledgement bit A from the slave unit is fetched, and at step 2003-6, it is determined whether or not the acknowledgement bit A is "0" (active). Only when the acknowledgement bit A is "0", does the control proceed to steps 2004-6 and 2004-6. Otherwise, the control proceeds to steps 2006-6 and 2007-6. At step 2004-6, the address ADD is caused to be ADD35'. Then, at step 2005-6, the sampling time is set in the timer 19 and the timer 19 is restarted. On the other hand, at step 2006-6, the address ADD is caused to be ADD1, and at step 2007-6, the edge detection interrupt operation is allowed and the timer interrupt operation is prohibited, thus changing the transmitting mode into a standby state for a receiving mode. Then, the routine of FIG. 8 is completed by step 2008-6.

Figure 21:
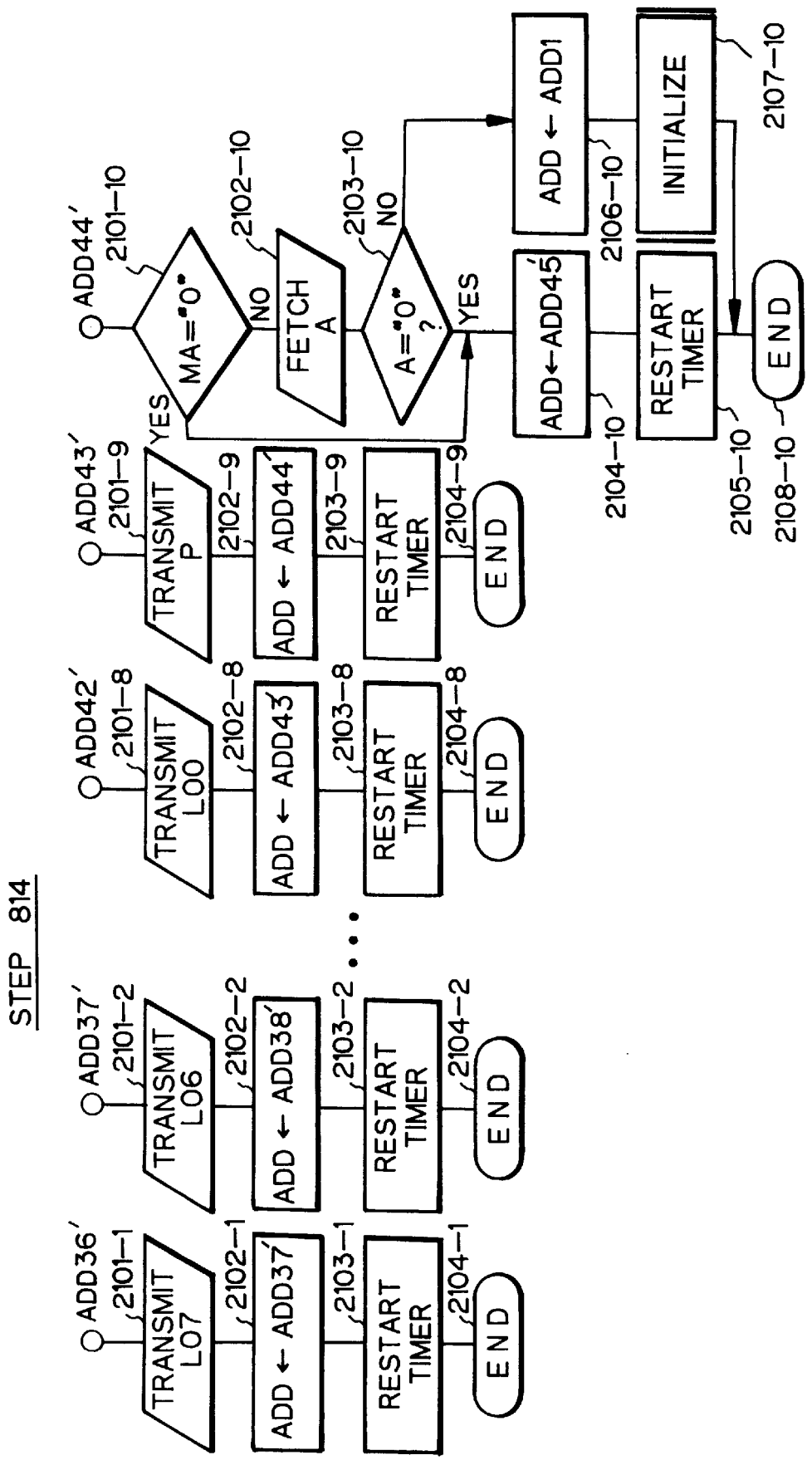

In FIG. 21, which is a detailed flowchart of step 814 of FIG. 6, if ADD=ADD36', at step 2101-1, an MSB L07 of message length bits, which are in this case 8 bits, is transmitted via the serial interface 21 and the D2B transmitter 12 to the D2B bus 2. Next, at step 2102-1, the address ADD is caused to be ADD37'. Next, at step 2103-1, the sampling time is set in the timer 19 and the timer 19 is restarted. Then, the routine of FIG. 8 is completed by step 2104-1.

Also, if ADD=ADD37', at step 2101-2, a message length bit L06 is transmitted via the serial interface 21 and the D2B transmitter 12 to the D2B bus 2. Next, at step 2102-2, the address ADD is caused to be ADD28'. Next, at step 2103-2, the sampling time is set in the timer 19 and the timer 19 is restarted. Then, the routine of FIG. 8 is completed by step 2104-2.

Similarly, if ADD=ADD42', at step 2101-8, an LSB S00 of the slave address bits is transmitted via the serial interface 21 and the D2B transmitter 12 to the D2B bus 2. Next, at stop 2102-8, the address ADD is caused to be ADD43'. Next, at step 2103-8, the sampling time is set in the timer 19 and the timer 19 is restarted. Then, the routine of FIG. 8 is completed by step 2104-8.

Further, if ADD=ADD43', at step 2101-9, a parity bit P of the slave address bits, is transmitted via the serial interface 21 and the D2B transmitter 12 to the D2B bus 2. Next, at step 2102-9, the address ADD is caused to be ADD44'. Next, at step 2103-9, the sampling time is set in the timer 19 and the timer 19 is restarted. Then, the routine of FIG. 8 is completed by step 2104-9.

In addition, if ADD=ADD44', at step 2101-10, it is determined whether or not the transmitted multiaddress (MA) bit is "0" (active). Only when the multiaddress bit is "1", does the control proceed to step 2102-10. Otherwise, the control proceeds directly to step 2102-10. At step 2102-10, the acknowledgement bit A from the slave unit is fetched, and at steps 2103-10, it is determined whether or not the acknowledgement bit is "0" (active). only when the acknowledgement bit A is "0", does the control proceed to steps 2104-10 and 2104-10. Otherwise, the control proceeds to steps 2106-10 and 2107-10. At step 2104-10, the address ADD is caused to be ADD45'. Then, at step 2105-10, the sampling time is set in the timer 19 and the timer 19 is restarted. On the other hand, at step 2106-10, the address ADD is caused to be ADD1, and at step 2107-10, the edge detection interrupt operation is allowed and the timer interrupt operation is prohibited, thus changing the transmitting mode into a standby state for a receiving mode. Then, the routine of FIG. 8 is completed by step 2108-10.

In FIG. 22, which is a detailed flowchart of step 816 of FIG. 8, if ADD=ADD45', at step 2201-1, an MSB D07 of a one-byte data is transmitted via the serial interface 21 and the D2B transmitter 12 to the D2B bus 2. Next, at step 2202-1, the address ADD is caused to be ADD46'. Next, at step 2203-1, the sampling time is set in the timer 19 and the timer 19 is restarted. Then, the routine of FIG. 8 is completed by step 2204-1.

Also, if ADD=ADD46', at step 2201-2, a second bit D06 of the one-byte data is transmitted via the serial interface 21 and the D2B transmitter 12 to the D2B bus 2. Next, at step 2202-2, the address ADD is caused to be ADD47'. Next, at step 2203-2, the sampling time is set in the timer 19 and the timer 19 is restarted. Then, the routine of FIG. 8 is completed by step 2204-2.

Similarly, if ADD=ADD52', at step 2201-8, an LSB D00 of the one-byte data is transmitted via the serial interface 21 and the D2B transmitter 12 to the D2B bus 2. Next, at step 2202-8, the address ADD is caused to be ADD53'. Next, at step 2203-8, the sampling time is set in the timer 19 and the timer 19 is restarted. Then, the routine of FIG. 8 is completed by step 2204-8.

Further, if ADD=ADD53', at step 2201-9, a parity bit P of the one-byte data is transmitted via the serial interface 21 and the D2B transmitter 12 to the D2B bus 2. Next, at step 2202-9, the address ADD is caused to be ADD54'. Next, at step 2203-9, the sampling time is set in the timer 19 and the timer 19 is restarted. Then, the routine of FIG. 8 is completed by step 2204-9.

In addition, if ADD=ADD54', at step 2201-10, it is determined whether or not the transmitted multiaddress (MA) bit is "0" (active). Only when the multiaddress bit is "1", does the control proceed to step 2202-10. Otherwise, the control proceeds directly to step 2202-10. At step 2202-10, the acknowledgement bit A from the slave unit is fetched, and at step 2203-10, it is determined whether or not the acknowledgement bit A is "0" (active). Only when the acknowledgement bit A is "0", does the control proceed to step 2204-10. Otherwise, the control proceeds to steps 2208-10 and 2209-10. At step 2204-10, the transmitted number L of bytes is counted down by 1, i.e.,

L←L−1

Then, at step 2205-10, it is determined whether or not the number L has reached 0. only when L reaches 0, does the control proceed to steps 2208-10 and 2209-10. Otherwise, the control proceeds to steps 2206-10 and 2207-10. At step 2206-10, the address ADD is caused to be ADD45'. Then, at step 2207-10, the sampling time is set in the timer 19 and the timer 19 is restarted. On the other hand, at step 2208-10, the address ADD is caused to be ADD1, and at step 2209-10, the edge detection interrupt operation is allowed and the timer interrupt operation is prohibited, thus changing the transmitting mode into a standby state for a receiving mode. Then, the routine of FIG. 8 is completed by step 2210-10.

As explained hereinabove, according to the present invention, since a timer is operated in response to an edge of a serial signal, and a fetching operation of a bit data or a transmitting operation is carried out in response to the timer, reception and transmission of serial data can be carried out without requiring complex hardware.

I claim:

1. A serial data transmission apparatus connected to a data transmission bus, comprising:

an edge detecting means for detecting an edge in a signal at said data transmission bus;

timer means;

first operating means for operating said timer means in response to said edge, said first operating means being stopped when said timer means is being operated; and second operating means for carrying out one of an operation of fetching a bit data on said data transmission bus and an operation of transmitting a bit data to said data transmission bus, in response to said timer means whose content reaches a predetermined value.

2. The apparatus as set forth in claim 1, wherein said second operating means restarts said tinter means in response to said timer means whose content reaches said predetermined value.

3. The apparatus as set forth in claim 1, wherein said second operating means stops said timer means and operates said first operating means in response to the bit data fetched by said fetching operation being abnormal.

4. The apparatus as set forth in claim 3, wherein said second operating means sets said apparatus in a standby state for a receiving mode when said first operating means is operated.

5. The apparatus as set forth in claim 1, wherein said second operating means stops said timer means and operates said first operating means in response to the bit data transmitted by said transmitting operation being abnormal.

6. The apparatus as set forth in claim 5, wherein said second operating means sets said apparatus in a standby state for a receiving mode when said first operating means is operated.

7. The apparatus as set forth in claim 1, wherein said second operating means comprises:

fetching means for fetching a bit data on said data transmission bus at a timing delayed from a timing when said transmitting operation is carried out; and means for comparing a data fetched by said fetching means with the bit data transmitted by said transmitting operation, to thereby determine whether or not said apparatus occupies said data transmission bus.

8. The apparatus as set forth in claim 7, wherein said second operating means further comprises means for transferring said apparatus to a standby state for a receiving mode when said apparatus does not occupy said data transmission bus.

9. A serial data transmission apparatus connected to a data transmission bus, comprising:

an edge detecting means for detecting an edge in a signal at said data transmission bus;

timer means;

an edge interrupt operating means for operating said timer means in response to said edge, said edge interrupt operating means being stopped when said timer means is being operated;

a timer interrupt operating means for carrying out a fetching operation of a bit data on said data transmission bus during a receiving mode and a transmitting operation of a bit data to said data transmission bus during a transmitting mode, in response to said timer means whose content reaches a predetermined value, and restarting said timer means.

\* \* \* \* \*